US012587026B2

(12) United States Patent
Papadopoulos et al.

(10) Patent No.: US 12,587,026 B2
(45) Date of Patent: Mar. 24, 2026

(54) DYNAMICALLY SELECTABLE POWER AND CHARGING CONFIGURATIONS

(71) Applicant: Atmosic Technologies, Inc., Campbell, CA (US)

(72) Inventors: Dimitrios Filippos Papadopoulos, San Jose, CA (US); Manolis Terrovitis, Athens (GR); Justin Ann-Ping Hwang, Sunnyvale, CA (US)

(73) Assignee: Atmosic Technologies, Inc., Campbell, CA (US)

( * ) Notice: Subject to any disclaimer, the term of this patent is extended or adjusted under 35 U.S.C. 154(b) by 31 days.

(21) Appl. No.: 18/127,190

(22) Filed: Mar. 28, 2023

(65) Prior Publication Data

US 2024/0235240 A1 Jul. 11, 2024

Related U.S. Application Data

(63) Continuation-in-part of application No. 18/124,962, filed on Mar. 22, 2023, and a continuation-in-part of application No. 18/124,974, filed on Mar. 22, 2023.

(60) Provisional application No. 63/437,361, filed on Jan. 5, 2023.

(51) Int. Cl.
| | |
|---|---|
| *H02J 7/00* | (2006.01) |
| *H02J 7/34* | (2006.01) |
| *H02J 7/35* | (2006.01) |
| *H02J 9/04* | (2006.01) |
| *H02J 50/00* | (2016.01) |
| *H02J 50/20* | (2016.01) |

(52) U.S. Cl.
CPC .... *H02J 7/007182* (2020.01); *H02J 7/00032* (2020.01); *H02J 7/0063* (2013.01); *H02J 7/345* (2013.01); *H02J 7/35* (2013.01); *H02J 9/04* (2013.01); *H02J 50/001* (2020.01); *H02J 50/20* (2016.02)

(58) Field of Classification Search
CPC ...................................................... H02J 50/20
See application file for complete search history.

(56) References Cited

U.S. PATENT DOCUMENTS

| | | | | |
|---|---|---|---|---|
| 2012/0187897 A1* | 7/2012 | Lenk | ..................... | H02J 50/001 |
| | | | | 320/101 |
| 2013/0141033 A1* | 6/2013 | Bak | .......................... | H02J 7/04 |
| | | | | 320/106 |
| 2019/0288540 A1* | 9/2019 | Dang | .................... | H02J 50/005 |
| 2020/0077333 A1* | 3/2020 | Kito | ......................... | G01D 5/00 |
| 2020/0161607 A1* | 5/2020 | Penmetsa | .............. | H01M 50/20 |
| 2022/0140640 A1* | 5/2022 | Li | ..................... | H02J 7/007194 |
| | | | | 320/153 |

* cited by examiner

*Primary Examiner* — Daniel Kessie
(74) *Attorney, Agent, or Firm* — Meunier Carlin & Curfman LLC

(57) ABSTRACT

A method for powering a wireless device includes determining a presence or absence of a USB power source connected to the wireless device, determining a presence or absence of a battery connected to the wireless device, obtaining a level of energy harvested from a surrounding environment of the wireless device, and powering a load of the wireless device using one of the USB power source, the battery, or the harvested energy based on the presence or absence of the USB power source, the presence or absence of the battery, and the harvested energy level.

19 Claims, 18 Drawing Sheets

600

650

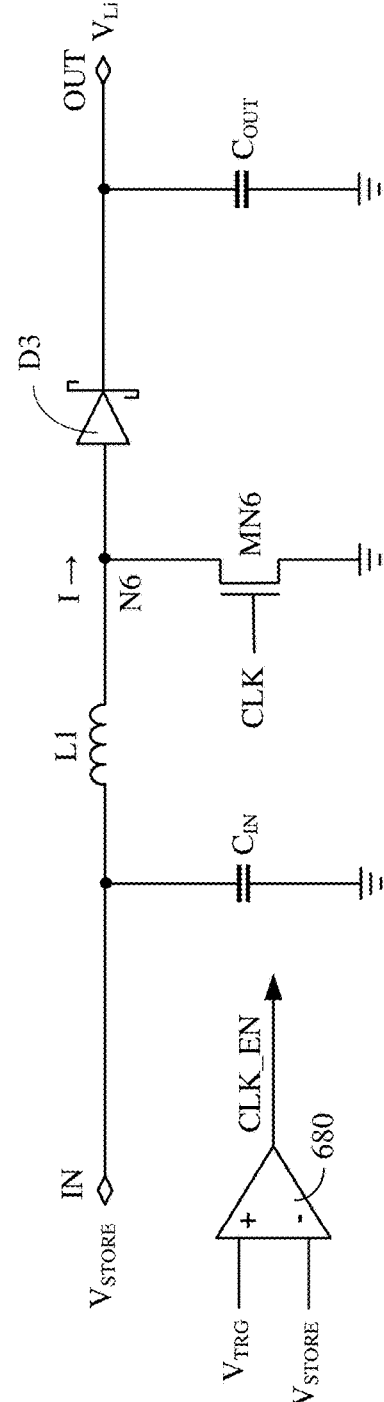
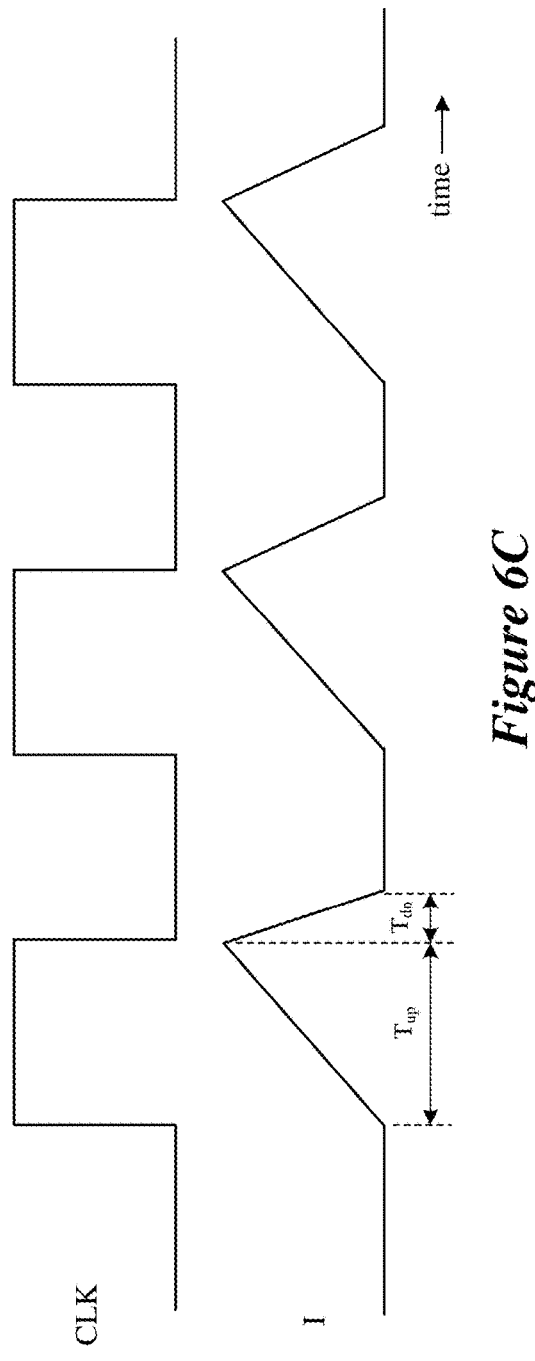
*Figure 6C*

800

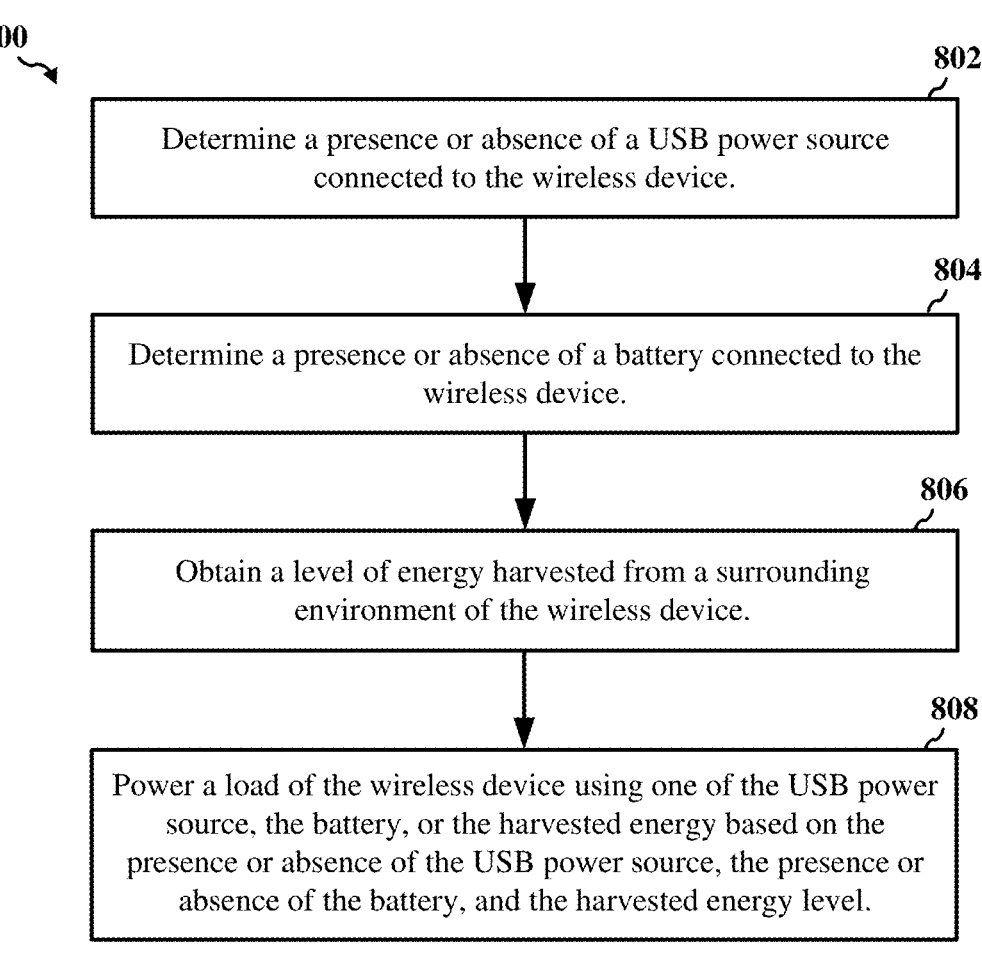

802

Determine a presence or absence of a USB power source connected to the wireless device.

804

Determine a presence or absence of a battery connected to the wireless device.

806

Obtain a level of energy harvested from a surrounding environment of the wireless device.

808

Power a load of the wireless device using one of the USB power source, the battery, or the harvested energy based on the presence or absence of the USB power source, the presence or absence of the battery, and the harvested energy level.

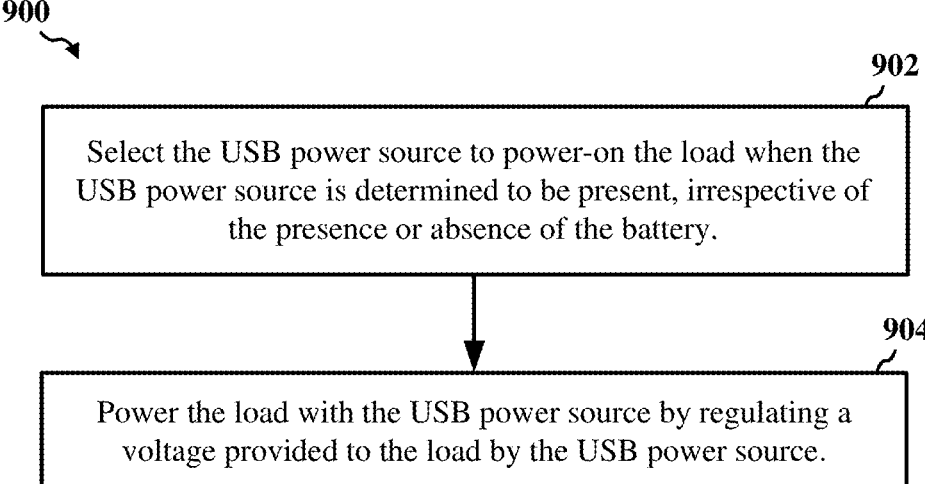

902

Select the USB power source to power-on the load when the USB power source is determined to be present, irrespective of the presence or absence of the battery.

904

Power the load with the USB power source by regulating a voltage provided to the load by the USB power source.

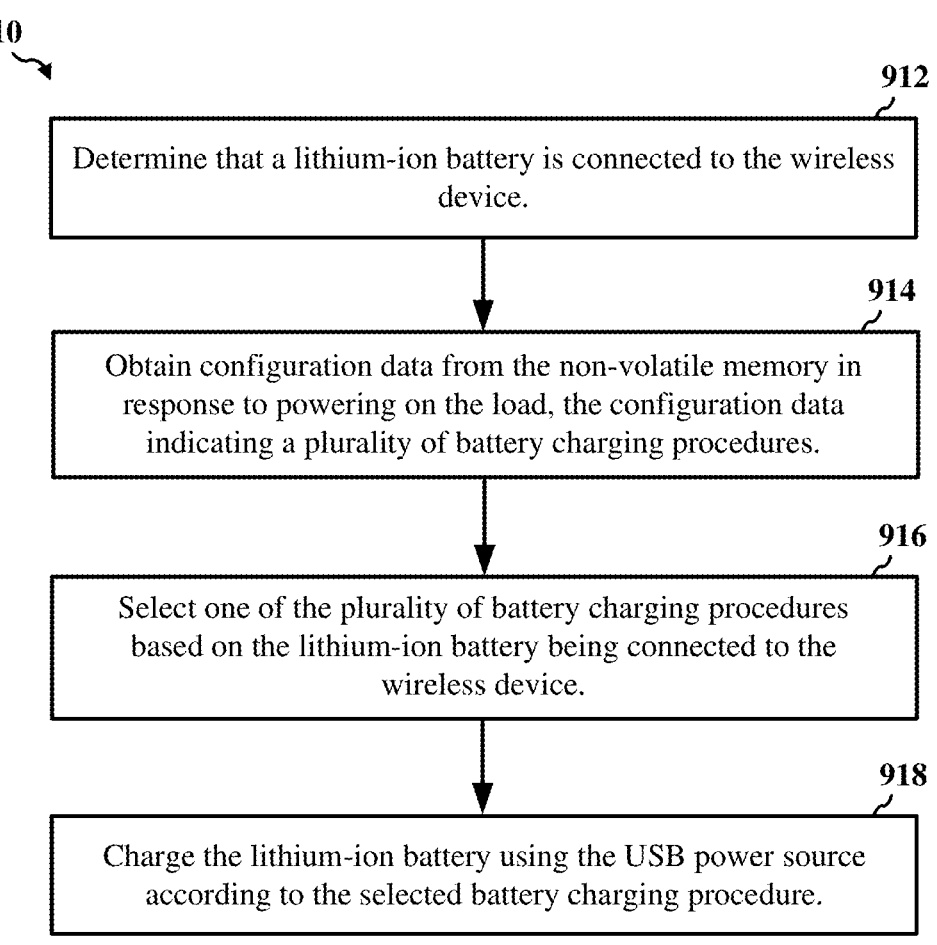

Determine that a lithium-ion battery is connected to the wireless device.

914

Obtain configuration data from the non-volatile memory in response to powering on the load, the configuration data indicating a plurality of battery charging procedures.

916

Select one of the plurality of battery charging procedures based on the lithium-ion battery being connected to the wireless device.

918

Charge the lithium-ion battery using the USB power source according to the selected battery charging procedure.

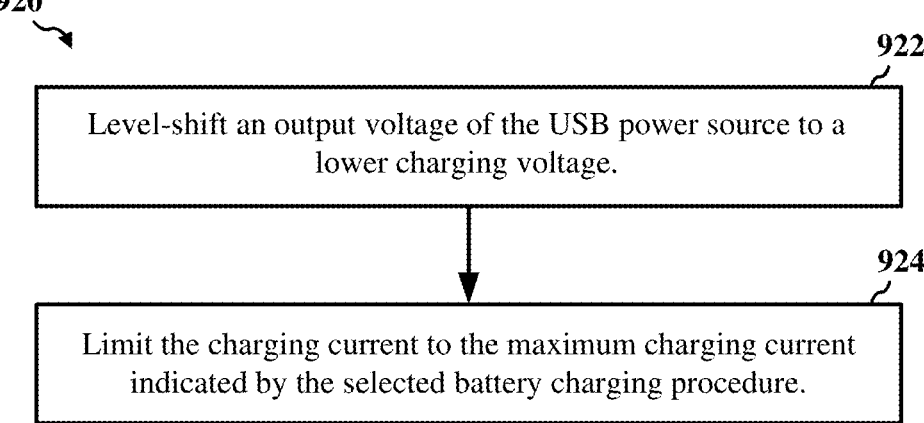

Level-shift an output voltage of the USB power source to a lower charging voltage.

924

Limit the charging current to the maximum charging current indicated by the selected battery charging procedure.

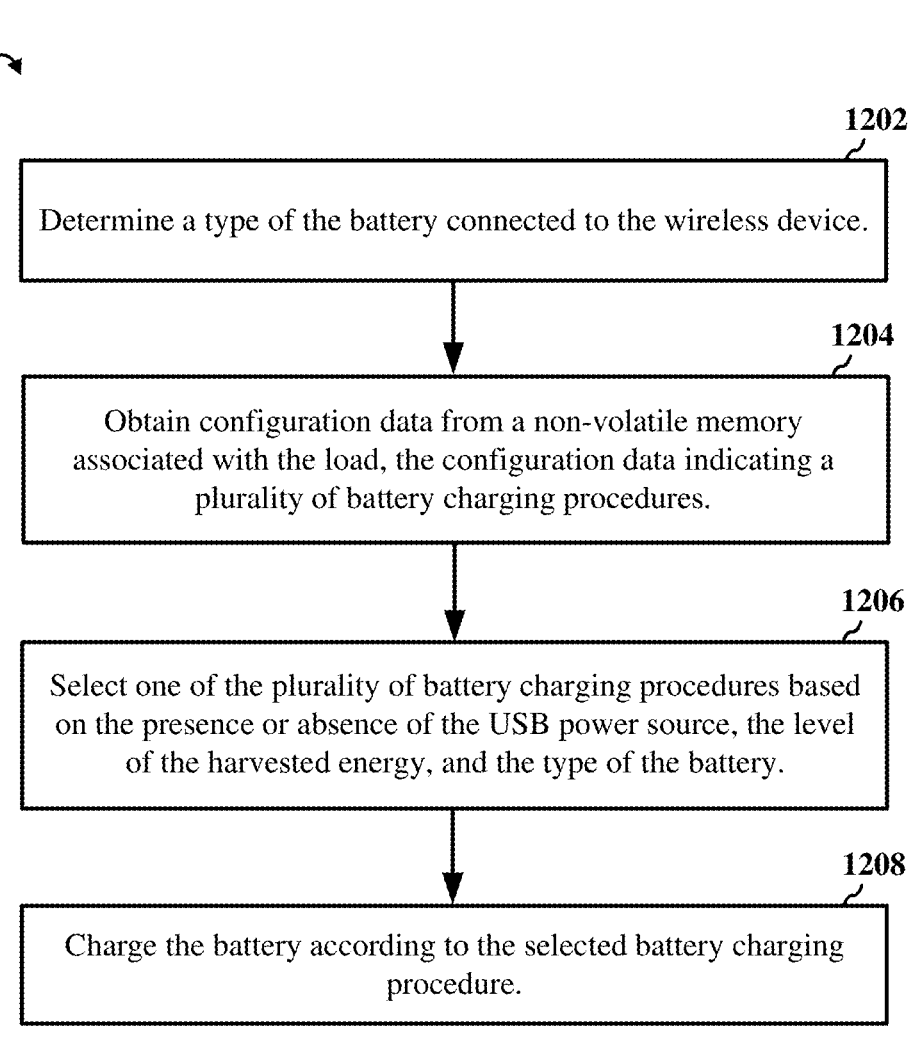

1200

1202

Determine a type of the battery connected to the wireless device.

1204

Obtain configuration data from a non-volatile memory associated with the load, the configuration data indicating a plurality of battery charging procedures.

1206

Select one of the plurality of battery charging procedures based on the presence or absence of the USB power source, the level of the harvested energy, and the type of the battery.

1208

Charge the battery according to the selected battery charging procedure.

*Figure 12*

DYNAMICALLY SELECTABLE POWER AND CHARGING CONFIGURATIONS

CROSS-REFERENCE TO RELATED APPLICATIONS

This Patent Application is a continuation-in-part application and claims priority to U.S. patent application Ser. No. 18/124,962 entitled "DYNAMICALLY SELECTABLE POWER CONFIGURATIONS" and filed on Mar. 22, 2023, and to U.S. patent application Ser. No. 18/124,974 entitled "DYNAMICALLY SELECTABLE CHARGING CONFIGURATIONS" and filed on Mar. 22, 2023, both of which claim priority to U.S. Provisional Patent Application No. 63/437,361 entitled "DYNAMICALLY SELECTABLE CHARGING AND POWER CONFIGURATIONS" and filed on Jan. 5, 2023, all of which are assigned to the assignee hereof. The disclosures of all prior Applications are considered part of and are incorporated by reference in this Patent Application.

TECHNICAL FIELD

The present implementations relate generally to wireless devices, and specifically to antennas implemented in wireless devices.

BACKGROUND OF RELATED ART

Wireless devices (such as Wi-Fi devices, Bluetooth devices, wireless sensors, and IoT devices and the like) are battery powered to provide mobility and convenience. Reducing the power consumption of wireless devices may increase the time between battery charging and extend battery life. Some wireless devices include an energy harvester that can capture energy (such as radio-frequency (RF) energy, solar energy, mechanical energy, piezoelectric energy, or thermoelectric energy, among other examples) and convert the captured energy into a voltage that can be used to charge the battery and to power various more application loads (such as microprocessor and transceiver chains) of a respective wireless device. These wireless devices typically include a control circuit coupled between the energy harvester, the battery, and the application loads that can manage charging and power delivery operations associated with the energy harvester. When the wireless device is powered-on, the control circuit initially uses the harvested energy to charge a capacitor (or other small charge storage device). When the capacitor has accumulated sufficient charge to power at least some of the application loads, the control circuit uses the harvested energy to charge the battery.

One drawback of these control circuits is that the application loads may not be powered by the battery until the battery's charge reaches a threshold level, which may take several hours using energy harvested from RF signals. In addition, these control circuits typically lack a mechanism to control current flow from the energy harvester to the battery, which may undesirably limit the size and type of battery that can be used. For example, to avoid over-charging the battery, the size, type, and capacity of the battery are usually selected based on the worst-case current flow through the control circuit, thereby excluding some battery sizes and types.

Thus, there is a need for a control circuit that can manage charging and power delivery operations for wireless devices that employ energy harvesters without limiting the size and type of batteries that can be used in such wireless devices.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a method for powering a wireless device. In some implementations, the method includes determining a presence or absence of a USB power source connected to the wireless device, determining a presence or absence of a battery connected to the wireless device, obtaining a level of energy harvested from a surrounding environment of the wireless device, and powering a load of the wireless device using one of the USB power source, the battery, or the harvested energy based on the presence or absence of the USB power source, the presence or absence of the battery, and the harvested energy level. In some instances, the load includes a non-volatile memory and one or more of a processor, a transceiver, or an I/O interface configured to be powered-on at system startup. The non-volatile memory stores configuration data containing a plurality of charging configurations for the wireless device. In some instances, the harvested energy is collected from radio-frequency (RF) signals transmitted in the surrounding environment. In other instances, the harvested energy is collected from sunlight present in the surrounding environment.

In some implementations, powering the load includes selecting the USB power source to power-on the load when the USB power source is determined to be present, irrespective of the presence or absence of the battery, and powering the load with the USB power source by regulating a voltage provided to the load by the USB power source. In some aspects, the method may also include determining that a lithium-ion battery is connected to the wireless device, obtaining configuration data from a non-volatile memory associated with the load in response to powering on the load, the configuration data indicating a plurality of battery charging procedures, selecting one of the plurality of battery charging procedures based on the lithium-ion battery being connected to the wireless device, and charging the lithium-ion battery using the USB power source according to the selected battery charging procedure. The selected battery charging procedure includes a constant current mode and a constant voltage mode, and also indicates a maximum charging current to be used for charging the lithium-ion battery during the constant current mode, a voltage at which the charging procedure transitions from the constant current mode to the constant voltage mode, and a minimum charging current to be used for charging the lithium-ion battery during the constant voltage mode. In some aspects, charging the lithium-ion battery also includes level-shifting an output voltage of the USB power source to a lower charging voltage, and limiting the charging current to the maximum charging current indicated by the selected battery charging procedure.

In other implementations, powering the load includes selecting the battery to power-on the load when the battery is present and the USB power source is absent, and powering the load with a voltage provided by the battery. In some instances, the method may also include determining a type of the battery connected to the wireless device, receiving configuration data from a non-volatile memory associated with the load after the load is powered on, the configuration data indicating a plurality of battery charging procedures, selecting one of the plurality of battery charging procedures based on the battery type and one or more operating parameters of the battery, and charging the battery according to the selected battery charging procedure. The battery type may be a low-voltage battery, and the selected battery charging procedure may include a constant current mode and not a constant voltage mode.

In some other implementations, powering the load includes selecting the harvested energy to power-on the load when the USB power source is absent and a voltage of the battery connected to the wireless device is less than a threshold voltage, powering the load with the harvested energy. In some instances, the method may also include charging a capacitor using the harvested energy until the charge stored on the capacitor reaches a threshold level, and charging the load using the capacitor when the charge stored on the capacitor exceeds the threshold level, and charging the battery using the capacitor until the voltage of the battery exceeds the threshold voltage.

In some other instances, the method may also include determining a type of the battery connected to the wireless device, obtaining configuration data from a non-volatile memory associated with the load, the configuration data indicating a plurality of battery charging procedures, selecting one of the plurality of battery charging procedures based on the presence or absence of the USB power source, the level of the harvested energy, and the type of the battery, and charging the battery according to the selected battery charging procedure. The configuration data may be loaded from the non-volatile memory into a power management circuit in response to the load being powered on. In some instances, the battery type is a lithium-ion battery and the lithium-ion battery is charged using the USB power source. In other instances, the battery type is a coin battery and the coin battery is charged using the harvested energy. In some other instances, the battery type is a coin battery and the coin battery is charged using a voltage stored on a capacitor.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Aspects of the present disclosure are illustrated by way of example and are not intended to be limited by the figures of the accompanying drawings.

FIG. 6C shows another example circuit that can be used as the second charge circuit of FIG. 3, according to some implementations.

FIGS. 8, 9A-9C, 10A-10B, 11A-11C, and 12 show illustrative flowcharts depicting example operations for configuring a wireless device, according to some implementations.

Like numbers reference like elements throughout the drawings and specification.

DETAILED DESCRIPTION

Figure 1:
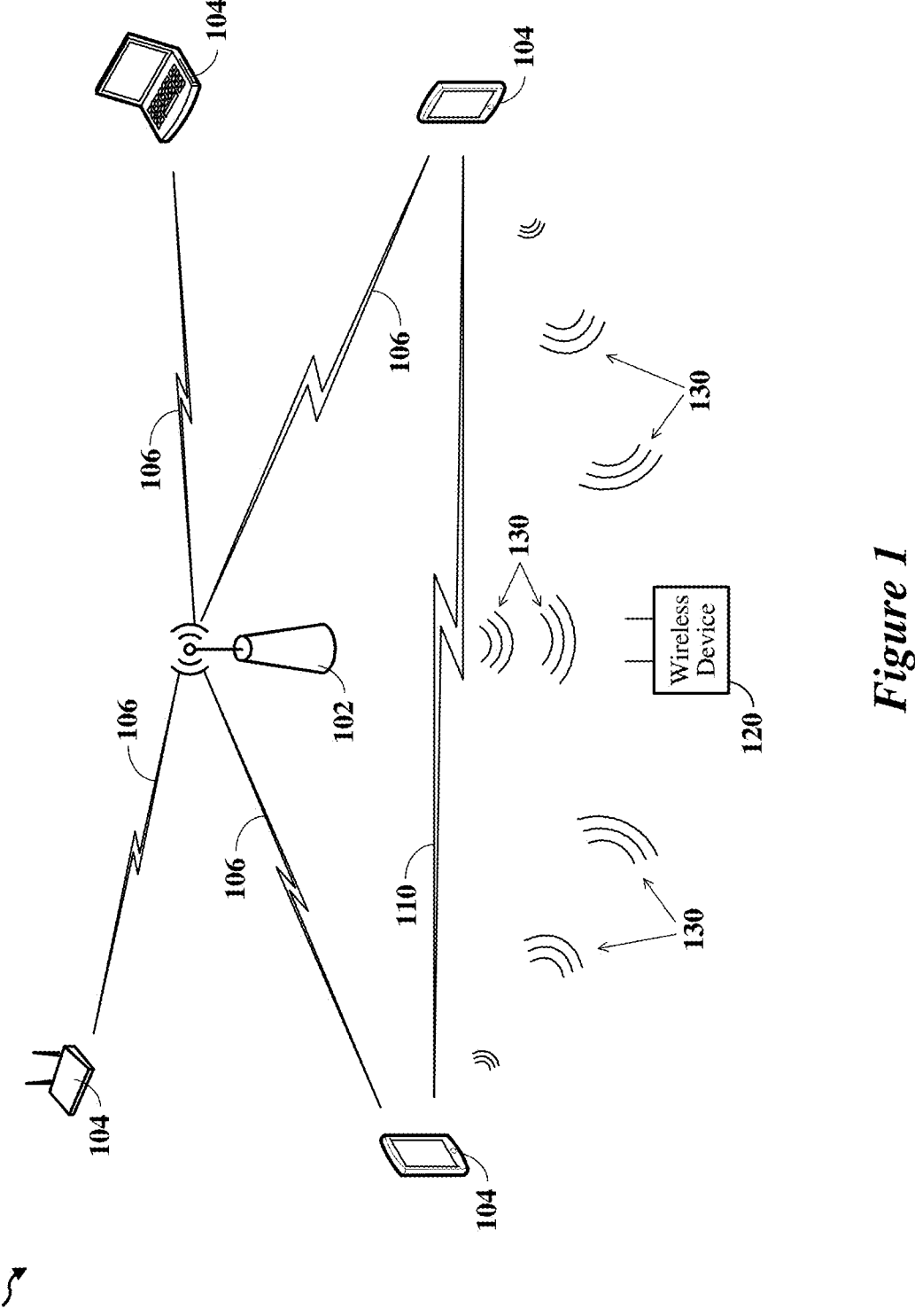
FIG. 1 shows a wireless communication system within which aspects of the present disclosure may be implemented.

The following description is directed to certain implementations for the purpose of describing innovative aspects of this disclosure. However, a person having ordinary skill in the art will readily recognize that the teachings herein can be applied in a multitude of different ways. The described implementations can be implemented in any device, system, or network that is capable of transmitting and receiving radio frequency (RF) signals according to one or more of the Institute of Electrical and Electronics Engineers (IEEE) 802.11 standards, the IEEE 802.15 standards, the Bluetooth® communication protocols defined by the Bluetooth Special Interest Group (SIG), or the Long Term Evolution (LTE) and Fifth Generation New Radio (5G NR) standards promulgated by the 3rd Generation Partnership Project (3GPP), among others. These RF signals may be transmitted or received using one or more of code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO), and multi-user (MU) MIMO.

Various implementations relate generally to energy harvesting in wireless devices, and more specifically to managing charging and power-on operations in wireless devices that employ energy harvesters. Conventional circuits for managing charging and power delivery operations for wireless devices that utilize energy harvesters have several drawbacks that may undesirably limit the both the type and the size of battery that can be employed by such wireless devices. As discussed, the size, type, and capacity of the battery are typically selected based on the worst-case current flow through the control circuit to avoid battery over-charging, which may preclude batteries of certain sizes and/or types from being employed by the wireless devices.

In addition, these conventional control circuits may not be able to support charging procedures associated with lithium-ion batteries. For example, lithium-ion batteries require specific charging procedures to obtain the fastest possible charging time without causing damage to the batteries. Specifically, the charging procedure for a lithium-ion battery typically includes a constant current mode followed by a constant voltage mode. During the constant current mode, the maximum constant current allowed by the lithium-ion battery is initially provided as a charging current to quickly charge the lithium-ion battery from an undervoltage level to a threshold voltage. When the battery voltage reaches the threshold voltage, the charging procedure transitions from the constant current mode to the constant voltage mode. During the constant voltage mode, the battery voltage is regulated at or slightly above the threshold voltage by gradually decreasing the charging current provided to the lithium-ion battery. When the charging current drops below a minimum current level, the charging procedure is termi-nated to avoid over-charging the lithium-ion battery.

In accordance with various aspects of the present disclo-sure, a wireless device includes an energy harvester config-ured to convert energy harvested from radio-frequency (RF) signals into a harvested voltage, a first port selectively connected to an external USB power source, a second port selectively connected to a battery, a load including a plu-rality of circuits, and a power management circuit coupled to the energy harvester, the first and second ports, and the load. The power management circuit includes a controller and a switcher matrix. The controller can select a particular power configuration for powering-on the load at system startup, and the switcher matrix can power the load using the power source indicated by the selected power configuration. For example, at system start-up, the controller may deter-mine which of the USB power source and one or more batteries are connected to the host device, and may also determine the voltage level of each battery connected to the host device and the amount of harvested energy available. The controller may use these determinations to select the power configuration to use for powering-on the load at system startup.

After the load is powered-on, configuration data indica-tive of a selected charging configuration may be read as a configuration bitstream from non-volatile memory in the load and thereafter stored in configuration registers associ-ated with the switcher matrix. The configuration data can be used to control or adjust the operation of various switches, analog circuits, and/or digital logic associated with the switcher matrix to implement the selected charging configu-ration. In some instances, the configuration data may indi-cate at least the battery type, the maximum operating volt-age, and the charging procedure of the battery. For example, for instances in which the battery is a lithium-ion battery, the configuration data may indicate that the lithium-ion battery uses a charging procedure that includes a constant current mode and a constant voltage mode, may indicate the maxi-mum charging current that can be used during the constant current mode, and may indicate the minimum charging current that can be used during the constant voltage mode. In this way, implementations of the subject matter disclosed herein may ensure that a lithium-ion battery can be charged in the least amount of time without over-charging the lithium-ion battery.

In the following description, numerous specific details are set forth such as examples of specific components, circuits, and processes to provide a thorough understanding of the disclosure. The term "coupled" as used herein means coupled directly to or coupled through one or more inter-vening components or circuits. Also, in the following description and for purposes of explanation, specific nomen-clature is set forth to provide a thorough understanding of the example embodiments. However, it will be apparent to one skilled in the art that these specific details may not be required to practice the example embodiments. In other instances, well-known circuits and devices are shown in block diagram form to avoid obscuring the disclosure. Any of the signals provided over various buses described herein may be time-multiplexed with other signals and provided over one or more common buses. Additionally, the inter-connection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The example implementations are not to be construed as limited to specific examples described herein but rather to include within their scope all embodiments defined by the appended claims.

The various illustrative logical blocks, modules, circuits, and instructions described in connection with the implemen-tations disclosed herein may be executed by one or more processors, such as one or more digital signal processors (DSPs), general purpose microprocessors, application spe-cific integrated circuits (ASICs), application specific instruc-tion set processors (ASIPs), field programmable gate arrays (FPGAs), or other equivalent integrated or discrete logic circuitry. The term "processor" as used herein may refer to any of the foregoing structures or any other structure suit-able for implementation of the techniques described herein. In addition, the functionality described herein may be pro-vided within dedicated software modules or hardware mod-ules configured as described herein. Also, the techniques disclosed herein may be fully implemented in one or more circuits or logic elements. A general-purpose processor may be a microprocessor, or may be any conventional processor, controller, microcontroller, or state machine. A processor may also be implemented as a combination of computing devices such as a DSP and a microprocessor, a plurality of microprocessors, or any other suitable configuration.

FIG. 1 shows a wireless environment 100 within which aspects of the present disclosure may be implemented. The wireless environment 100 may include any number of wireless communication devices such as a base station 102, various client devices 104, and a wireless device 120. Although only one base station 102 is shown in the example of FIG. 1, in other implementations, the wireless environ-ment 100 may include multiple base stations 102. Each of the client devices 104 also may be referred to as a wireless station (STA), a mobile station (MS), a mobile device, a mobile handset, a wireless handset, an access terminal (AT), a user equipment (UE), a subscriber station (SS), or a subscriber unit, among other examples. The client devices 104 may be various devices such as mobile phones, personal digital assistant (PDAs), other handheld devices, netbooks, notebook computers, tablet computers, laptops, display devices (for example, TVs, computer monitors, navigation systems, among other examples), music or other audio or stereo devices, remote control devices, printers, kitchen or other household appliances, key fobs (for example, for passive keyless entry and start (PKES) systems), among other examples.

In some implementations, the wireless environment 100 may be associated with a wireless local area network (WLAN) such as a Wi-Fi network that implements one or more of the IEEE 802.11 family of wireless communication standards or a cellular network that implements one or more of the 3GPP communication protocols. In other implementations, the wireless environment 100 may be associated with a mesh network operating according to the EasyMesh™ specification provided by the Wi-Fi Alliance or a wireless personal area network (WPAN) that implements one or more of the Bluetooth or Bluetooth Low Energy (BLE) Specifications. For these implementations, the client devices 104 can communicate with one another over direct communication links (such as BLE connections or mesh links), and the base station 102 may not be needed. In some other implementations, RF signals transmitted by base station 102 and client devices 104 may be based on proprietary, military, or other non-commercial communication standards.

The wireless device 120 includes an energy harvester that can convert energy associated with RF signals 130 transmitted by base station 102, client devices 104, and other sources of electromagnetic radiation into a voltage or current that can be used to power one or more components of the wireless device 120. In some instances, the wireless device 120 may include a battery and a small charge store device (such as a capacitor) that can store the harvested energy for subsequent use in powering various components of the wireless device 120. In other instances, the wireless device 120 may not include a battery. For example, the wireless device 120 may be an IoT device including (but not limited to) environmental sensor (such as temperature sensors, air pressure sensors, humidity sensors, etc.), a door position sensor, a window position sensor, a door or building access card, or an ID device for which a battery or external power source may not be feasible, available, or even desirable. In some aspects, the wireless device 120 may be powered entirely by energy harvested from RF signals 130 and other sources of electromagnetic radiation.

Figure 2:
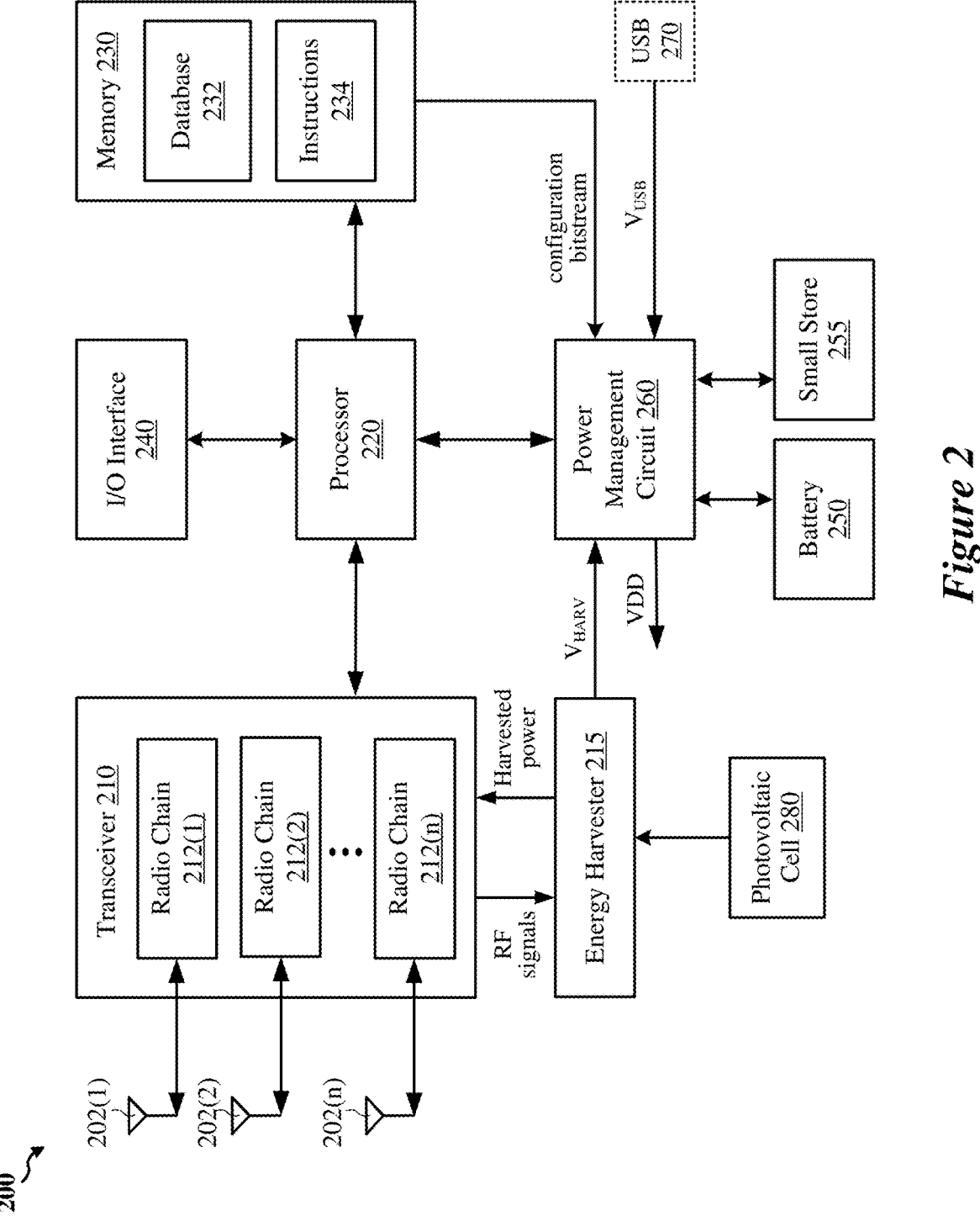
FIG. 2 shows a block diagram of an example wireless device.

FIG. 2 shows a block diagram of a wireless device 200 in accordance with various aspects of the present disclosure. In some implementations, the wireless device 200 may be an example of the wireless device 120 of FIG. 1. The wireless device 200 includes antennas 202(1)-202(n), a transceiver 210, an energy harvester 215, a baseband processor 220, a memory 230, an input/output (I/O) interface 240, a battery 250, and a power management circuit 260. The antennas 202(1)-202(n) can transmit and receive RF signals of various frequencies to and from other wireless devices. For example, in some instances, the antennas 202(1)-202(n) can transmit and receive RF signals in one or more of the 900 MHz frequency band, the 2.4 GHz frequency band, the 5 GHz frequency band, the 6 GHz frequency band, or the 60 GHz frequency band. In the example of Figure, the wireless device 200 is shown to include multiple antennas 202(1)-202(n) that can provide antenna diversity, enable multiple-input, multiple-output (MIMO) communications, and/or transmit or receive multiple spatial streams to or from other wireless devices. In some other implementations, the wireless device 200 may include only one antenna.

The I/O interface 240 may include any suitable mechanism, interface, or device to receive input (such as commands) from the user and to provide output to the user. For example, the I/O interface 240 may include (but are not limited to) a graphical user interface, keyboard, mouse, microphone, speakers, and so on. Although not shown for simplicity, in some instances, the wireless device 200 may also include a display upon which items may be presented to a user. In some aspects, the display may be a touch-screen display that allows the user to interact with various features, programs, and operations of the wireless device 200.

The transceiver 210 may be coupled to the antennas 202(1)-202(n), either directly or through an antenna selection circuit (not shown for simplicity). The transceiver 210 may be used to transmit signals to and receive signals from other wireless devices such as (but not limited to) the base station 102 and the client devices 104 of FIG. 1. The transceiver 210 may also be used to scan the surrounding environment to detect and identify nearby wireless devices. The transceiver 210 may include a plurality of radio chains 212(1)-212(n) that can be used to communicate with other wireless devices according to one or more wireless communication protocols such as (but not limited to) WLAN communications, Bluetooth communications, or cellular communications. Although not shown in FIG. 2 for simplicity, each of the radio chains 212(1)-212(n) may include a transmit chain and a receive chain. Each transmit chain may receive data to be transmitted from the baseband processor 220, upconvert the received data from a baseband frequency to a carrier frequency (such as 2.4 GHz or 5 GHz) and transmit the upconverted data to one or more other wireless devices via one or both antennas 202(1)-202(n). Each receive chain may receive data transmitted from other wireless devices via one or both antennas 202(1)-202(n), down-convert the received data from the carrier frequency to the baseband frequency and provide the down-converted data to the baseband processor 220. In some instances, the wireless device 200 may be configured for MIMO operations. The MIMO operations may include SU-MIMO operations and MU-MIMO operations. In some aspects, the wireless device 200 may also be configured for OFDMA communications or other suitable multiple access mechanisms.

In some implementations, the transceiver 210 may include a wake-up receiver (not shown for simplicity) configured to receive on-off keying (OOK) modulated RF signals. On-off keying uses the presence and absence of RF energy to encode data within the RF signal. For example, another wireless device may transmit an RF signal containing a relatively high amount of RF energy to indicate a first logical state (e.g., a logical one), and may transmit an RF signal containing a relatively low amount of RF energy to indicate a second logical state (e.g., a logical zero). The wake-up receiver can detect the energy level of an RF signal received from the other wireless device and determine the logical state indicated by the RF signal. A group of logical states indicated by such a signal can be used to identify and wake-up the wireless device 200. Although RF signals that convey information using an OOK mechanism can be modulated according to Wi-Fi, Bluetooth, BLE, or some other communication protocol, these RF signals can also use an unmodulated carrier signal within a frequency band from which the wake-up receiver is able to detect the presence (or absence) of RF energy. As such, the wake-up receiver does not need to demodulate received RF signals, but instead may receive and decode RF signals simply by detecting the presence or absence of RF energy on a wireless medium. In some aspects, the wake-up receiver may identify RF signals by correlating the detected RF energy with known energy patterns.

The energy harvester 215 can harvest energy from RF signals and other sources of electromagnetic radiation in a vicinity of the wireless device 200. The energy harvester 215 can convert the harvested energy into a voltage ($V_{HARV}$) or a current that can power one or more components of the wireless device 200. In some aspects, the energy harvester 215 may also provide envelope information associated with received RF signals. The RF envelope information may indicate a magnitude, a power density, or other metric associated with the received RF signal. In the example of FIG. 2, the wireless device 200 may also include a photovoltaic cell 280 that can capture photovoltaic energy for use in charging and/or power-on operations of the wireless device 200. In some instances, the photovoltaic cell 280 is coupled to the energy harvester 215, for example, as depicted in FIG. 2. In other instances, the photovoltaic cell 280 may be coupled to the power management circuit 260.

In other implementations, the wireless device 200 may include a plurality of energy harvesters 215 (not shown for simplicity). For example, in some aspects, each of the radio chains 212(1)-212(n) may be associated with a corresponding energy harvester 215. Additionally, the wireless device 200 also may include an antenna routing switch (not shown for simplicity) to flexibly couple any feasible antenna to any feasible energy harvester. In other aspects, some or all of the radio chains 212(1)-212(n) may be associated with multiple energy harvesters 215.

The baseband processor 220 is coupled to the transceiver 210 via one or more signal lines 222, is coupled to the memory 230 via one or more signal lines 224 and is coupled to the I/O interface 240 via one or more signal lines 226. The baseband processor 220 may be used to process signals received from the memory 230 and to forward the processed signals to the transceiver 210 for transmission via one or more of the antennas 202(1)-202(n). The baseband processor 220 may also be used to process signals received from one or more of the antennas 202(1)-202(n) via the transceiver 210 and to forward the processed signals to the memory 230. The baseband processor 220 may be any suitable processor capable of executing scripts or instructions of one or more software programs stored in the device 200 (e.g., within the memory 230). In some implementations, the baseband processor 220 may be or may include one or more microprocessors providing the processor functionality and external memory providing at least a portion of machine-readable media. In other implementations, the baseband processor 220 may be or may include an Application Specific Integrated Circuit (ASIC) with the processor, the bus interface, the user interface, and at least a portion of the machine-readable media integrated into a single chip. In some other implementations, the processor 220 may be or include one or more Field Programmable Gate Arrays (FPGAs) or Programmable Logic Devices (PLDs). In some aspects, the baseband processor 220 may manage radio functions for the wireless device 200.

The memory 230 may include a database 232 that can store profile information for the wireless device 200 and/or profile information for other wireless devices. The database 232 may also store capabilities, parameters, and/or configuration information for the wireless device 200 and/or for other wireless devices. The memory 230 may also include a non-transitory computer-readable medium (e.g., one or more nonvolatile memory elements, such as EPROM, EEPROM, Flash memory, a hard drive, etc.) that may store instructions 234 for execution by the baseband processor 220. For example, the baseband processor 220 can execute the instructions 234 to perform various operations associated with the wireless device 200 and format frames carrying data, commands, capabilities, parameters, and other information for transmission to one or more other wireless devices. The baseband processor 220 can also execute the instructions to control energy harvesting mechanisms associated with the wireless device 200.

The battery 250 may be any suitable battery or charge-storing device that stores a voltage that can be used to power various circuits and components associated with the wireless device 200. In the example of FIG. 2, the battery 250 may be charged using energy harvested from RF signals by the energy harvester 215 or may be charged using a voltage provided by an external USB power source 270. In some instances, the battery 250 may be a lithium-ion battery or other type of lithium-based battery that provides a relatively high operating voltage (such as 4.6V). In other instances, the battery 250 may be a low-voltage battery such as a nickel-cadmium "coin" battery that provides a relatively low operating voltage (such as 3.3V). In some aspects, the relatively high voltage may be as high as 4.6V, and the relatively low voltage may be less than 3.3V. In other aspects, the relatively low voltage may be as low as 0.9V.

The wireless device 200 may include a small charge store device 255 that can store enough charge to power at least some components of the wireless device 200. In some instances, the small charge store device 255 may be used to charge the battery 250. In various aspects, the small charge store device 255 may be a capacitor having a capacitance between 100-400 μF. In other aspects, the small charge store device 255 may be a super-capacitor.

The power management circuit 260 includes a first input to receive a configuration bitstream from the memory 230, a second input coupled to the energy harvester 215, a first I/O port coupled to the battery 250, a second I/O port coupled to the small charge store device 255, a third I/O port that can be connected to an external USB power source 270 capable of providing a supply voltage ($V_{USB}$), and an output to provide a supply voltage (VDD) to various components of the wireless device 200 via respective power rails (not shown for simplicity). The configuration bitstream, which may be stored in a suitable non-volatile memory (not shown for simplicity) within or associated with memory 230, includes configuration data that indicates at least the battery type, the maximum operating voltage, and the charging procedure of the battery 250. For example, for instances in which the battery 250 is a lithium-ion battery, the configuration data may indicate that the battery 250 is lithium-ion based, the battery 250 uses a charging procedure that includes a constant current mode and a constant voltage mode, and the maximum operating voltage of the battery 250, among other examples. The configuration data may also indicate the maximum charging current that can be used during the constant current mode of the charging procedure and the minimum charging current that can be used during the constant voltage mode of the charging procedure. In some instances, the configuration data may also indicate a charging configuration for the power management circuit 260.

Figure 3:
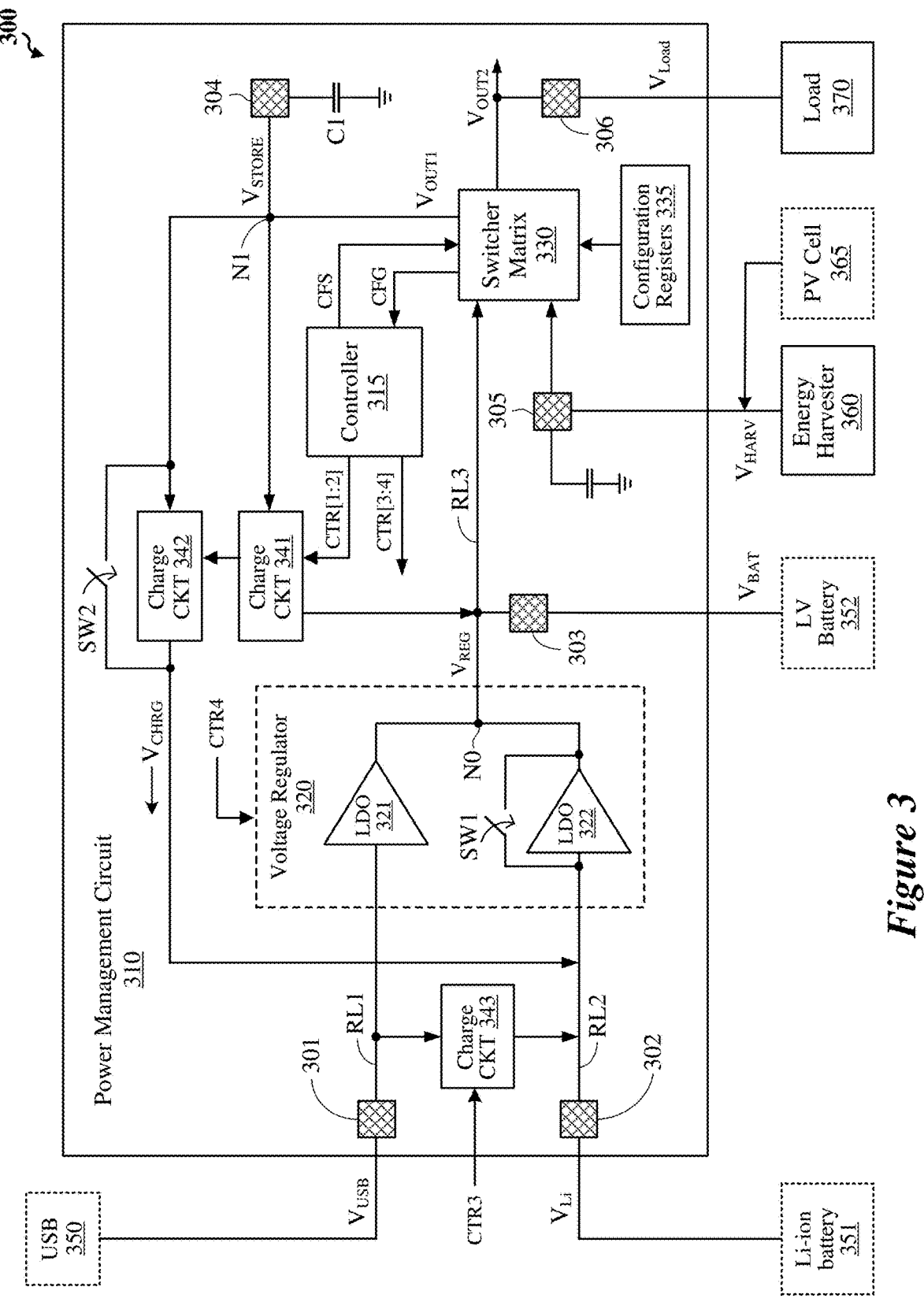
FIG. 3 shows a block diagram of an example power management circuit, according to some implementations.

FIG. 3 shows an example configuration 300 of a power management circuit 310, according to some implementations. The power management circuit 310, which may be one example of the power management circuit 260 of FIG. 2, may select and control various charging and power configurations for an associated host device (not shown for simplicity). In some instances, the host device may be the wireless device 200 of FIG. 2. In other instances, the host device may be another suitable wireless device that can harvest energy from RF signals or sunlight. In accordance with aspects of the present disclosure, the power management circuit 310 can dynamically implement a variety of different charging and power configurations for the host device based on one or more battery characteristics, the presence (or absence) of an external USB power source, and the amount of voltage harvested by the energy harvester 360. In various implementations, the battery characteristics may include the availability of one or more batteries, the types and capacities of each available battery, and the charge level of each available battery, among other examples. In some instances, the presence (or absence) of the external USB power source and the presence (or absence) of each battery can be determined at system startup.

The power management circuit 310 may include I/O ports 301-305, voltage rails RL1-RL3, a power management controller 315, a voltage regulator 320, a switcher matrix 330, charge circuits 341-343, a capacitor C1, and configuration registers 335. The first I/O port 301 can be coupled to an external USB power source 350 (when present or available) that provides a supply voltage ($V_{USB}$) to the power management circuit 310, the second I/O port 302 can be coupled to a lithium-ion battery 351 (when present or available) having a relatively high operating voltage ($V_{Li}$), the third I/O port 303 can be coupled to a low-voltage battery 352 (when present or available) having a relatively low operating voltage ($V_{BAT}$), and the fourth I/O port 304 is coupled to the capacitor C1. In some aspects, the relatively high voltage $V_{Li}$ associated with the lithium-ion battery 351 may be as high as 4.6V, and the relatively low voltage $V_{BAT}$ associated with the low-voltage battery 452 may be 3.3V or lower. As used herein, a low-voltage battery is a battery having an operating voltage less than approximately 3.3V, and a high-voltage battery is a battery having an operating voltage greater than approximately 3.3V. The fifth I/O port 305 is coupled to an energy harvester 360 that can provide a harvested voltage ($V_{HARV}$) to the power management circuit 310, and the sixth I/O port 306 is coupled to a load 370 representing various circuits, components, and/or modules of the host device. In some instances, the fifth I/O port 305 may also be coupled to a photovoltaic cell 365.

The capacitor C1, which may be one example of the small charge store device 255 of FIG. 2, may be any suitable capacitor, super-capacitor, or other small charge store device that can store enough charge or voltage to power at least some portions of the host device. In some instances, the capacitor C1 stores a voltage ($V_{STORE}$) that can be used during system startup, for example, to power-on one or more components of the host device (as represented by the load 370). In some aspects, the capacitor C1 may have a capacitance between 100-400 µF.

The charge circuits 341-343 may be any suitable circuits or devices that can provide a particular charging current and/or charging voltage to one or more batteries according to their respective charging procedures. The first charge circuit 341 is coupled between the first output of the switcher matrix 330 and the input terminal of the low-voltage battery 352, and includes a control terminal to receive a first control signal CTR1. In some aspects, the first control signal CTR1 can be used to enable or disable the first charge circuit 341, to adjust one or more settings of the first charge circuit 341, and to set or modify a value of the charging voltage provided to the low-voltage battery 352 during battery charging operations, among other examples. In some instances, the first charge circuit 341 can be used to charge low-voltage batteries based at least in part on the first control signal CTR1. In some implementations, the first charge circuit 341 may step-down the voltage $V_{STORE}$ provided by capacitor C1, for example, to ensure that any low-voltage battery coupled to I/O port 303 is not over-charged or provided with a charging current that exceeds a maximum charging current of the respective low-voltage battery.

In some instances, the first charge circuit 341 can be implemented as an LDO voltage regulator with current limiting that can emulate the constant current mode of a battery charging operation, as described in more detail with reference to FIG. 5A. In other instances, the first charge circuit 341 can be implemented as programmable current mirror sourced from capacitor C1 and having an output to drive the input terminal of the low-voltage battery 352, as described in more detail with reference to FIG. 5B. In some other instances, the first charge circuit 341 can be implemented as a bypass switch coupled between capacitor C1 and the low-voltage battery 352 and responsive to current limiting by the switcher matrix 330.

The second charge circuit 342 is coupled between the first output of the switcher matrix 330 and the input terminal of the lithium-ion battery 351, and includes a control terminal to receive a second control signal CTR2. In some aspects, the second control signal CTR2 can be used to enable or disable the second charge circuit 342, to adjust one or more settings of the second charge circuit 342, and to set or modify a value of the charging voltage provided to the lithium-ion battery 351 during battery charging operations, among other examples. In some instances, the second charge circuit 342 may be configured to charge the lithium-ion battery 351 based at least in part on the second control signal CTR2. In some instances, the second charge circuit 342 can be implemented as a voltage rectifier, as described in more detail with reference to FIG. 6A. In other instances, the second charge circuit 342 can be implemented as a pair of diodes coupled between the switcher matrix 330 and the lithium-ion battery 351 and clocked through a capacitor, as described in more detail with reference to FIG. 6B. In some other instances, the second charge circuit 342 can be implemented as a DC-to-DC boost converter, as described in more detail with reference to FIG. 6C. In some implementations, the second charge circuit 342 may step-up the voltage $V_{OUT1}$ provided by the switcher matrix 330 to provide a charging voltage sufficient to charge the lithium-ion battery 351 (or other suitable high-voltage battery). For example, in some aspects, the second charge circuit 342 may boost the voltage $V_{OUT1}$ provided by the switcher matrix 330 from approximately 3.1 volts to a higher charging voltage of approximately 4.5 volts (or other suitable charging voltage for a lithium-ion battery). In other implementations, the second charge circuit 342 may be configured to charge non-lithium-ion batteries (or other batteries for which their respective charging procedures include providing a constant charging current).

The third charge circuit 343 is coupled between the USB power source 350 and the lithium-ion battery 351, and includes a control terminal to receive a third control signal CTR3. In some aspects, the third control signal CTR3 can be used to enable or disable the third charge circuit 343, to adjust one or more settings of the third charge circuit 343, and to set or modify a value of the charging voltage provided to the lithium-ion battery 351 during battery charging operations, among other examples. In some instances, the third charge circuit 343 may be used to charge the lithium-ion battery 351 according to an associated charging procedure. In some instances, the third charge circuit 343 can be implemented as an LDO voltage regulator that emulates the constant current mode of a lithium-ion battery charging operation, as described in more detail with reference to FIG. 7A. In other instances, the third charge circuit 343 can be implemented as programmable current mirror sourced from the USB power source 350, as described in more detail with reference to FIG. 7B. For example, in some aspects, the third charge circuit 343 may level-shift the voltage $V_{USB}$ provided by the USB power source 350 to a lower voltage suitable for charging the lithium-ion battery 351. In other implementations, the third charge circuit 343 may be used to charge non-lithium-ion batteries (or other batteries for which their respective charging procedures include providing a constant charging current).

The energy harvester 360, which may be one example of the energy harvester 215 of FIG. 2, can be any suitable circuit, device, or mechanism that can convert energy harvested from RF signals and other electromagnetic radiation into a voltage $V_{HARV}$. In addition, or in the alternative, the photovoltaic cell 365 may be used to generate the harvested voltage $V_{HARV}$. The photovoltaic cell 365 may be one example of the photovoltaic cell 280 of FIG. 2 or may be another suitable photovoltaic cell. In some aspects, the harvested voltage $V_{HARV}$ may be used to power at least some portions of the load 370, for example, thereby allowing these portions of the load 370 to be powered-on without using either the lithium-ion battery 351 or the low-voltage battery 352. The harvested voltage $V_{HARV}$ may also be used to charge capacitor C1 and/or the low-voltage battery 352 (if connected to the host device). In this way, capacitor C1 and the low-voltage battery 352 can be charged using energy harvested from RF signals, photovoltaic sources (e.g., sunlight), and/or other sources of electromagnetic radiation. In some aspects, the energy harvester 360 may also detect the presence (or absence) of RF signals within one or more frequency bands such as (but not limited to) the 900 MHz frequency band, the 2.4 GHz frequency band, the 5 GHz frequency band, the 6 GHz frequency band, and the 60 GHz frequency band.

The load 370 may include or represent various circuit components associated with the host device such as (but not limited to) processors, memory, I/O interfaces, ASICs, and digital logic, among other examples. In some implementations, the load 370 may include the transceiver 210, processor 220, memory 230, and I/O interface 240 of the wireless device 200 of FIG. 2. In some instances, the load 370 can be powered by the charge or voltage stored in or accumulated by capacitor C1. In other instances, the load 370 can be powered by energy harvested from RF signals and other electromagnetic radiation by the energy harvester 360. In some other instances, the load 370 can be powered by the lithium-ion battery 351 or the low-voltage battery 352. In addition, when the host device is connected to the USB power source 350, the power management circuit 310 can use the voltage ($V_{USB}$) provided by the USB power source 350 to power the load 370 at system startup and/or to charge the lithium-ion battery 351 after system startup. In some aspects, the power management circuit 310 can also use $V_{US}$S to charge the low-voltage battery 352.

The voltage regulator 320 includes a pair of low-dropout (LDO) voltage regulators 321-322 coupled between respective voltage rails RL1-RL2 and a node N0, and includes a control terminal to receive a fourth control signal CTR4. In some aspects, the fourth control signal CTR4 can be used to enable or disable the LDO voltage regulators 321-322, to adjust one or more settings of the LDO voltage regulators 321-322, to set or modify a value of the regulated voltage ($V_{REG}$) provided at node N0, and to turn switch SW1 on and off, among other examples. The first LDO voltage regulator 321 includes an input coupled to the first rail RL1 and an output coupled to node N0, and the second LDO voltage regulator 322 includes an input coupled to the second rail RL2 and an output coupled to node NO. The voltage regulator 320 may also include a bypass switch SW1 coupled between the input and output of the second LDO voltage regulator 322. In some instances, the first and second LDO voltage regulators 321-322 can regulate the voltage at node NO even when the voltage approaches an operating voltage of the host device. LDO voltage regulators do not exhibit switching noise, consume less circuit area, and have a simpler design than traditional switching DC-to-DC voltage regulators.

The switcher matrix 330 may include any suitable combination of analog circuits and digital logic that can be programmed or otherwise configured to operate in a plurality of different modes or configurations. In the example of FIG. 3, the switcher matrix 330 includes a first input coupled to the energy harvester 360 via I/O port 305, a second input coupled to the voltage regulator 320 via the third voltage rail RL3 at node N0, a first output coupled to the capacitor C1 via I/O port 304, and a second output coupled to the load 370 via I/O port 306. The first output of the switcher matrix 330 may provide a first output voltage $V_{OUT1}$ to one or more of the first charge circuit 341, the second charge circuit 342, or the capacitor C1 based on the harvested voltage $V_{HARV}$ provided by the energy harvester 360 and/or the photovoltaic cell 365. The second output of the switcher matrix 330 may provide a second output voltage $V_{OUT2}$ to the load 370 based on the harvested voltage $V_{HARV}$, the voltage $V_{BAT}$ provided by the low-voltage battery 352, the voltage $V_{Li}$ provided by the lithium-ion battery 351, or the voltage $V_{USB}$ provided by the USB power source 350.

The switcher matrix 330 may also include a control terminal to receive a configuration signal (CFS) that can be used to select or change the configuration of the switcher matrix 330. For example, in some aspects, the configuration of the switcher matrix 330 can be selected based on one or more of the presence of a connection with the USB power source 350, the presence of a connection with the lithium-ion battery 351, the presence of a connection with the low-voltage battery 352, the charge level of the lithium-ion battery 351, the charge level of the low-voltage battery 352, the charge level of capacitor C1, and the amount or level of harvested voltage ($V_{HARV}$) provided by the energy harvester 360, among other examples. In some instances, the switcher matrix 330 may be a multiple-input multiple-output DC-to DC converter that can either increase an input voltage to a higher output voltage (such as boosting $V_{HARV}$ to a higher output voltage $V_{OUT1}$ or $V_{OUT2}$) or reduce an input voltage to a lower output voltage. In some aspects, the outputs of the switcher matrix 330 may have a maximum voltage of approximately 3.3V, thereby limiting the output voltages $V_{OUT1}$ and $V_{OUT2}$ of the switcher matrix 330 to approximately 3.3V.

In accordance with various aspects of the present disclosure, configuration data indicative of a selected mode or configuration may be stored as a configuration bitstream in non-volatile memory (not shown for simplicity) associated with the load 370. During system startup, the configuration bitstream may be accessed, routed to, and stored in configuration registers 335 associated with the switcher matrix 330. The configuration data stored in the configuration registers 335 can be used to control or adjust the operation of various switches, analog circuits, and/or digital logic (not shown for simplicity) associated with the switcher matrix 330, for example, to implement a particular charging configuration.

In some aspects, the configuration registers 335 may provide the configuration data (CFG) to the controller 315 after system startup, and digital circuits within or associated with the controller 315 can use the configuration data, along with the control signals CTR[1:5], to control or adjust operations of the charge circuits 341-343, the voltage regulator 320, and other components of the power management circuit 310 to implement the particular charging configuration indicated by the configuration data.

In some implementations, the configuration data may indicate the battery type or class, specified operating voltages, maximum charge levels, maximum charging currents, and other suitable information pertaining to each battery connected to the host device (e.g., the lithium-ion battery 351 and/or the low-voltage battery 352). The configuration data may also indicate the capacitance and target charge level of capacitor C1 and the amount of harvested energy available, among other examples. In this way, the switcher matrix 330 can use the configuration data to select an appropriate charging procedure for one or more batteries connected to the host device, irrespective of the specific battery types, sizes, and charging procedures. In this way, the same power management circuit 310 may be employed by a variety of host devices that employ different battery types, sizes, and configurations by dynamically programming the power management circuit 310 to operate according to different charging and power configurations.

Lithium-ion batteries typically require specific charging procedures to obtain the fastest possible charging time without causing damage to the batteries. For example, a lithium-ion battery may require a charging procedure that includes a constant current mode followed by a constant voltage mode. During the constant current mode, the maximum constant current allowed by the lithium-ion battery is used for charging the lithium-ion battery relatively quickly from an undervoltage level to a threshold voltage. In some instances, the maximum charging current may be between 1 and 2 times the battery's specific capacity. For example, if the specific capacity of the lithium-ion battery 351 is 80 mAh, then the maximum charging current is approximately $2*80=160$ mA. When the battery voltage reaches the threshold voltage, the charging procedure transitions from the constant current mode to the constant voltage mode. During the constant voltage mode, the battery voltage is regulated at or slightly above the threshold voltage, which causes the charging current to gradually decrease. When the charging current reaches a minimum level, the charging procedure is terminated to avoid over-charging the lithium-ion battery.

Thus, in accordance with various aspects of the present disclosure, the configuration data may indicate the type of battery connected to the host device, the overvoltage, undervoltage, and brownout battery level for the battery, the specific charging procedures of the battery (which may include the maximum charging current that can be used in the constant current mode and the minimum charging that can be used in the constant voltage mode), and which of the charging circuits 341-343 is to be enabled. In this way, the power management circuit 310 may ensure that the connected battery is charged in the least amount of time without over-charging the battery. In addition, or in the alternative, the configuration data stored in the configuration registers 335 may also control the operation of charging circuits 341-343, the voltage regulator 320, and other components of the power management circuit 310.

The controller 315 may include any suitable combination of analog circuits and digital logic that can program, configure, or otherwise instruct various circuits, components, and modules associated with the power management circuit 310 to implement a particular charging and/or power configuration at system startup. For example, the analog circuits within the controller 315 may determine the default configuration of the power management circuit 310 at system startup (e.g., before the configuration data stored in the load 370 is provided to and stored in the configuration registers 335). After system startup, the digital circuits within the controller 315 may use the configuration data stored in the configuration registers 335 to implement a selected configuration mode for the power management circuit 310. Although not shown for simplicity, the controller 315 may also include (or be associated with) one or more sensors, circuits, or other devices that can detect the presence (or absence) of the external USB power source 350, the presence (or absence) of the lithium-ion battery 351, and the presence (or absence) of the low-voltage battery 352. The controller 315 can also determine the charge or voltage levels of the lithium-ion battery 351, the low-voltage battery 352, the energy harvester 360, and the capacitor C1.

In some instances, the analog circuits within the controller 315 can select one of the external USB power source 350, the lithium-ion battery 351, the low-voltage battery 352, or the energy harvester 360 as a power source to boot-up the load 370 at system startup based on one or more of the presence of the external USB power source 350, the presence of the lithium-ion battery 351, the presence of the low-voltage battery 352, the amount of charge or voltage stored by the lithium-ion battery 351, the amount of charge or voltage stored by the low-voltage battery 352, the amount or level of the harvested voltage ($V_{HARV}$), or the amount or level of charge stored ($V_{STORE}$) on capacitor C1, among other examples. The controller 315 can also monitor the voltage levels associated with each of the USB power source 350, the lithium-ion battery 351, the low-voltage battery 352, the energy harvester 360, and capacitor C1.

For example, when the presence of the USB power source 350 is detected, the controller 315 may select a charging configuration in which the USB power source 350 is used to power-on the load 370 at system startup and thereafter used to charge one or more batteries connected to the host device. For another example, when the USB power source 350 is not detected and the presence of the lithium-ion battery 351 is detected, the controller 315 may select another charging configuration in which the lithium-ion battery 351 is used to power-on the load 370 at system startup and thereafter used to charge one or more batteries connected to the host device. For another example, when the USB power source 350 and the lithium-ion battery 351 are not detected and the presence of the low-voltage battery 352 is detected, the controller 315 may select yet another charging configuration in which the low-voltage battery 352 is used to power-on the load 370 at system startup and thereafter used to charge capacitor C1.

In various implementations, the controller 315 may generate the configuration signal CFS and the control signals CTR1-CTR4 based at least in part on the respective availabilities of the USB power source 350, the lithium-ion battery 351, and the low-voltage battery 352 and the respective charge levels of the lithium-ion battery 351, the low-voltage battery 352, the harvested voltage ($V_{HARV}$), and the charge ($V_{STORE}$) stored on capacitor C1. Specifically, in some aspects, the controller 315 may provide the configuration signal CFS to the switcher matrix 330 during system startup. The configuration signal CFS may configure, instruct, or causes the switcher matrix 330 to implement a specific power configuration during system startup. The controller 315 may use the first control signal CTR1 to selectively enable or disable the first charge circuit 341 during system startup, may use the second control signal CTR2 to selectively enable or disable the second charge circuit 342 during system startup, and may use the third control signal CTR3 to selectively enable or disable the third charge circuit 343 during system startup. The controller 315 may use the fourth control signal CTR4 to selectively enable or disable the voltage regulator 320, and to adjust one or more settings of the voltage regulator 320 such as, for example, the value of the regulated voltage $V_{REG}$ and the conductive state of switch SW1, among other examples.

At system start-up, the controller 315 may determine which of the USB power source 350, the lithium-ion battery 351, and the low-voltage battery 352 are connected to the host device, and may also determine the voltage level of each battery connected to the host device, the amount of harvested energy available as $V_{HARV}$, and the charge level of capacitor C1. The controller 315 may use these determinations to select a power configuration to be used by the power management circuit 310 to power-on the load 370 at system startup. For example, when the USB power source 350 and/or a battery connected to the host device can be used to power-on the load 370, the controller 315 may configure the power management circuit 310 to power the load 370 using either the USB power source 350 or the connected battery, thereby conserving energy harvested by the energy harvester 360 and conserving the relatively small amount of charge stored on capacitor C1. Conversely, when neither the USB power source 350, the lithium-ion battery 351, nor the low-voltage battery 352 are connected to the host device or are capable of powering the load 370, the controller 315 may configure the power management circuit 310 to power the load 370 using either the harvested voltage ($V_{HARV}$) or the charge ($V_{STORE}$) stored on capacitor C1.

In some implementations, the controller 315 may assign priorities to the USB power source 350, the lithium-ion battery 351, and the low-voltage battery 352, and select the power configuration based at least in part on the assigned priorities. In some instances, the USB power source 350 may be assigned a higher priority than the lithium-ion battery 351, and the lithium-ion battery 351 may be assigned a higher priority than the low-voltage battery 352. For example, when the controller 315 determines that the USB power source 350 is connected to the host device and available as a power source, the controller 315 selects the USB power source 350 as the power source for powering-on the load 370 at during system startup, irrespective of whether the lithium-ion battery 351 or the low-voltage battery 352 are connected to the host device. When the USB power source 350 is not available and both the lithium-ion battery 351 and the low-voltage battery 352 are connected to the host device and available as power sources, the controller 315 selects the lithium-ion battery 351 as the power source for powering-on the load 370 at system startup. When neither the USB power source 350 nor the lithium-ion battery 351 are connected to the host device, the controller 315 selects the low-voltage battery 352 as the power source for powering-on the load 370 at system startup.

In some instances, neither the USB power source 350, the lithium-ion battery 351, nor the low-voltage battery 352 may be connected to the host device or capable of powering the load 370 at system startup. As such, when the controller 315 detects or determines that the USB power source 350, the lithium-ion battery 351, and the low-voltage battery 352 are not available or cannot provide enough power or voltage to power the load 370, the controller 315 selects either the harvested voltage $V_{HARV}$ or the voltage stored on capacitor C1 to power-on the load 370 during system startup. In some aspects, the controller 315 may select capacitor C1 to power the load 370 at system startup when the stored voltage $V_{STORE}$ on capacitor C1 is greater than a threshold voltage, and may select the energy harvester 360 and/or the photovoltaic cell 365 to power the load 370 at system startup when the stored voltage $V_{STORE}$ on capacitor C1 is less than the threshold voltage. Specifically, to select capacitor C1 to power the load 370, the controller 315 may use the configuration signal CFS to configure or instruct the switcher matrix 330 to couple fourth I/O port 304 to sixth I/O port 306 and to isolate capacitor C1 from the energy harvester 360 and/or the photovoltaic cell 365. Then, at system startup, the switcher matrix 330 couples the capacitor C1 to the load 370 and isolates capacitor C1 from the energy harvester 360 and/or the photovoltaic cell 365, thereby allowing the stored voltage $V_{STORE}$ to propagate through the switcher matrix 330 and power the load 370.

To select the energy harvester 360 and/or the photovoltaic cell 365 to power the load 370, the controller 315 may use the configuration signal CFS to configure or instruct the switcher matrix 330 to initially couple fifth I/O port 305 to fourth I/O port 304 until the stored voltage $V_{STORE}$ on capacitor C1 reaches or exceeds the threshold voltage, and then couple fourth I/O port 304 to sixth I/O port 306 so that the stored voltage $V_{STORE}$ propagates through the switcher matrix 330 and powers the load 370. Then, at system startup, the switcher matrix 330 couples the energy harvester 360 and/or the photovoltaic cell 365 to the capacitor C1 and isolates the load 370 from the energy harvester 360 and/or the photovoltaic cell 365, thereby allowing the harvested voltage $V_{HARV}$ to propagate through the switcher matrix 330 and charge capacitor C1. When the stored voltage $V_{STORE}$ on capacitor C1 reaches the threshold level, the switcher matrix 330 couples the capacitor C1 to the load 370 and isolates capacitor C1 from the energy harvester 360 and/or the photovoltaic cell 365, thereby allowing the stored voltage $V_{STORE}$ to propagate through the switcher matrix 330 and power the load 370.

When the load 370 is powered on, configuration data stored within non-volatile memory components (not shown for simplicity) of the load 370 is accessed and routed as a configuration bitstream to the configuration registers 335. Once stored in the configuration registers 335, the configuration data programs or configures the power management circuit 310 (e.g., the switcher matrix 330 and charge circuits 341-343) to operate in a selected power configuration based at least in part on the respective availabilities of the USB power source 350, the lithium-ion battery 351, and the low-voltage battery 352 and/or the type, size, and charging procedure of each battery connected to the host device. In some aspects, the non-volatile memory associated with the load 370 may store a plurality of different charging configurations that can be used for charging one or more of capacitor C1, the lithium-ion battery 351, or the low-voltage battery 352 after system startup.

Figure 4A:
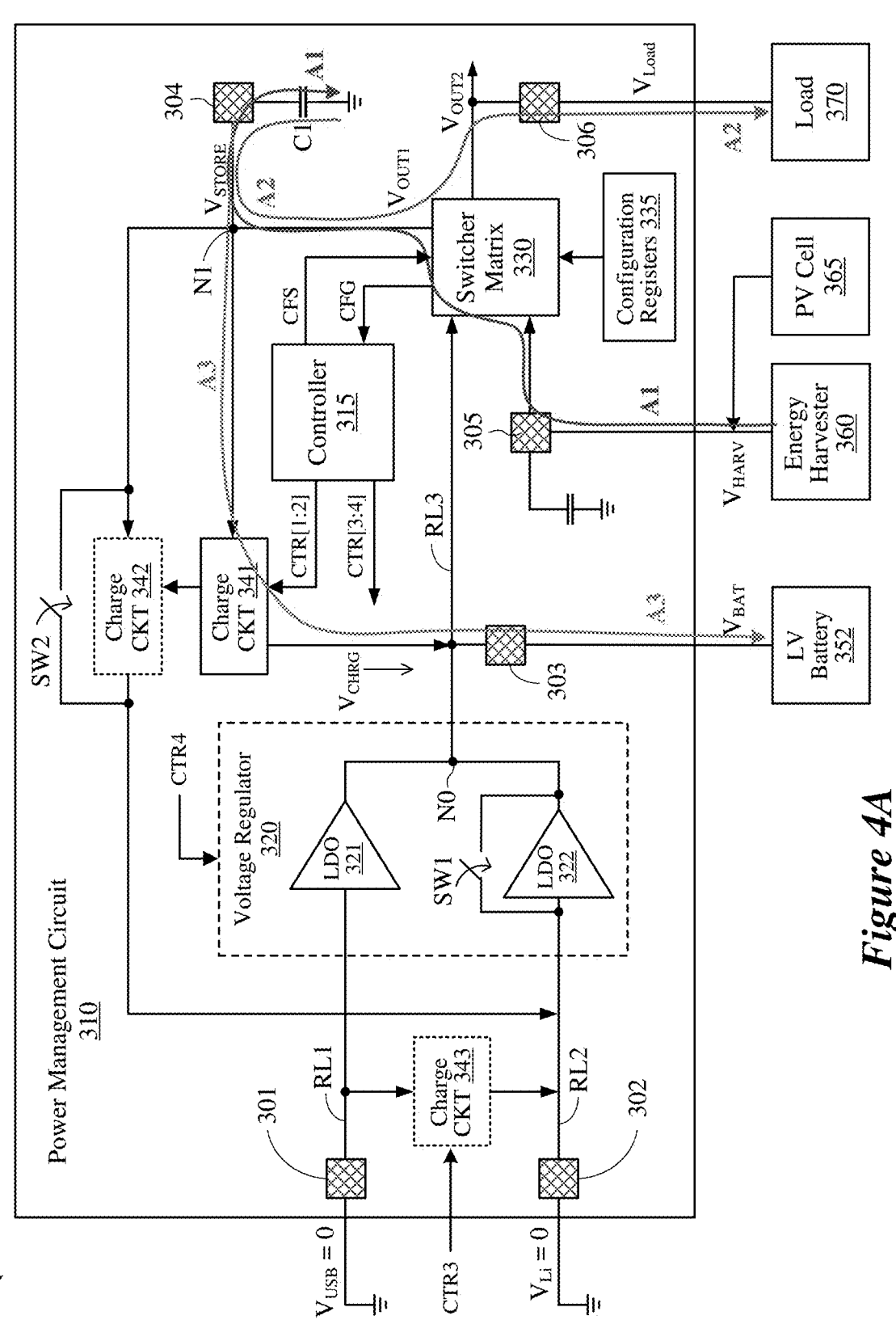
FIG. 4A shows a block diagram of the power management circuit of FIG. 3 in a first configuration, according to some implementations.

In some instances, neither the USB power source 350 nor the lithium-ion battery 351 may be connected to the host device and the low-voltage battery 351, although connected to the host device, may not have enough charge or voltage to power the load 370 at system startup. In some aspects, the controller 315 may select a first power configuration that uses harvested energy to power the load 370 at system startup. For example, FIG. 4A depicts the first configuration 400A of the power management circuit 310, according to some implementations. As shown, neither the USB power source 350 nor the lithium-ion battery 351 are connected to the host device, and therefore the first configuration 400A connects respective first and second I/O ports 301 and 302 to ground and disables respective charge circuits 343 and 342. As discussed, when the low-voltage battery 352 does not have enough charge or voltage to power the load 370 at system startup, the controller 315 may configure, instruct, or otherwise cause the switcher matrix 330 to connect the energy harvester 360 to the capacitor C1 at system startup. In this way, the harvested voltage $V_{HARV}$ can propagate through the switcher matrix 330 and appear as a first output voltage $V_{OUT1}$ on node N1 at system startup. The first output voltage $V_{OUT1}$ charges capacitor C1 via fourth I/O port 304 until the accumulated charge or stored voltage $V_{STORE}$ on capacitor C1 reaches the threshold voltage, as depicted by arrow A1 in FIG. 4A. In some aspects, the controller 315 may use the first control signal CTR1 to disable the first charge circuit 341 and thereby isolate capacitor C1 from the low-voltage battery 352, which may increase the speed with which capacitor C1 is charged by eliminating any loading on fourth I/O port 304 caused by the low-voltage battery 352.

Once the stored voltage $V_{STORE}$ on capacitor C1 reaches the threshold level, the switcher matrix 330 decouples capacitor C1 from the energy harvester 360 and couples capacitor C1 to the load 370. The stored voltage $V_{STORE}$ propagates through the switcher matrix 330 as $V_{OUT2}$ and powers the load 370 via sixth I/O port 306, as depicted by arrow A2. Once the load 370 is powered-up, the configuration data stored in the load 370 is read out as a configuration bitstream and stored in the configuration registers 335 associated with the switcher matrix 330. In the example of FIG. 4A, the configuration signal CFS provided by the controller 315 configures, instructs, or otherwise causes the switcher matrix 330 to select the first configuration 400A for the power management circuit 310.

The first configuration 400A enables the first charge circuit 341 and thereby couples capacitor C1 to the low-voltage battery 352 through fourth I/O port 304 and 303. The first charge circuit 341 charges the low-voltage battery 352 using the stored voltage $V_{STORE}$ on capacitor C1 until the voltage $V_{BAT}$ on the low-voltage battery 352 reaches its operating voltage, as indicated by arrow A3. In some instances, the first charge circuit 341 may dynamically deliver power to the low-voltage battery 352 based on the voltage $V_{STORE}$ on capacitor C1. For example, if the voltage $V_{STORE}$ falls below a configured level while capacitor C1 is powering the load 370, the first charge circuit 341 may wait to charge the low-voltage battery 352 using capacitor C1 until the voltage $V_{STORE}$ exceeds the configured level.

Figure 4B:
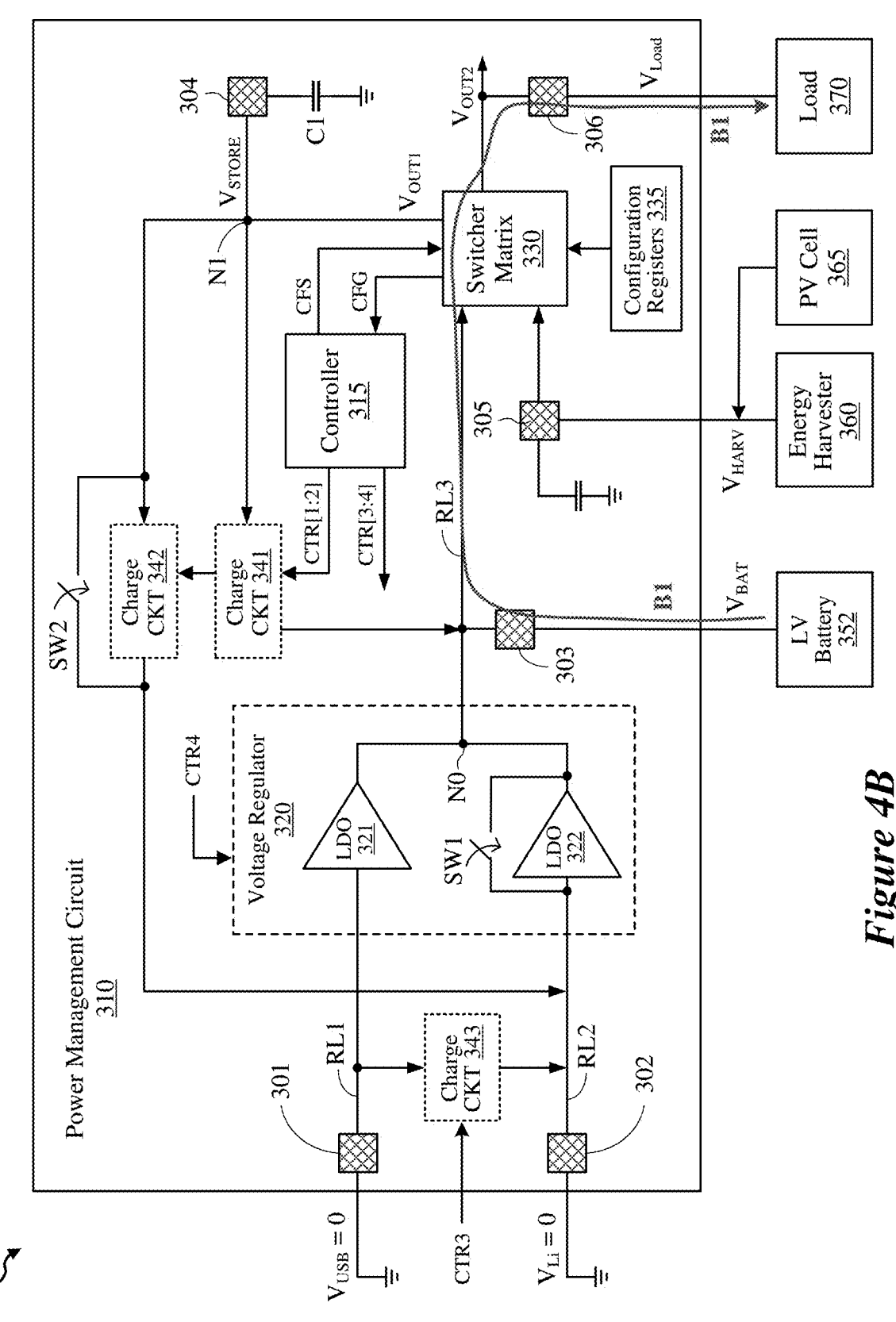
FIG. 4B shows a block diagram of the power management circuit of FIG. 3 in a second configuration, according to some implementations.

In other instances when neither the USB power source 350 nor the lithium-ion battery 351 are connected to the host device and the low-voltage battery 352 is connected to the host device, the low-voltage battery 352 may have enough charge or voltage to power the load 370 at system startup. In some aspects, the controller 315 may select a second configuration that uses the voltage $V_{BAT}$ stored in the low-voltage battery 352 to power the load 370 at system startup. For example, FIG. 4B depicts the second configuration 400B of the power management circuit 310, according to some implementations. As shown, neither the USB power source 350 nor the lithium-ion battery 351 are connected to the host device, and therefore the second configuration 400B connects respective first and second I/O ports 301 and 302 to ground and disables respective charge circuits 343 and 342. In some instances, the second configuration 400B can also disable the first charge circuit 341 because capacitor C1 is not used to power the load 370 at system startup. As discussed, when the low-voltage battery 352 has enough charge or voltage to power the load 370 at system startup, the controller 315 may configure, instruct, or otherwise cause the switcher matrix 330 to connect the low-voltage battery 352 to the load 370 at system startup. In this way, battery voltage $V_{BAT}$ can propagate through the switcher matrix 330 and appear as $V_{OUT2}$ at sixth I/O port 306 at system startup, depicted by arrow B1. The voltage $V_{OUT2}$ is used to power-up the load 370, which outputs the configuration data stored in non-volatile memory for storage in the configuration registers 335 associated with the switcher matrix 330.

Figure 4C:
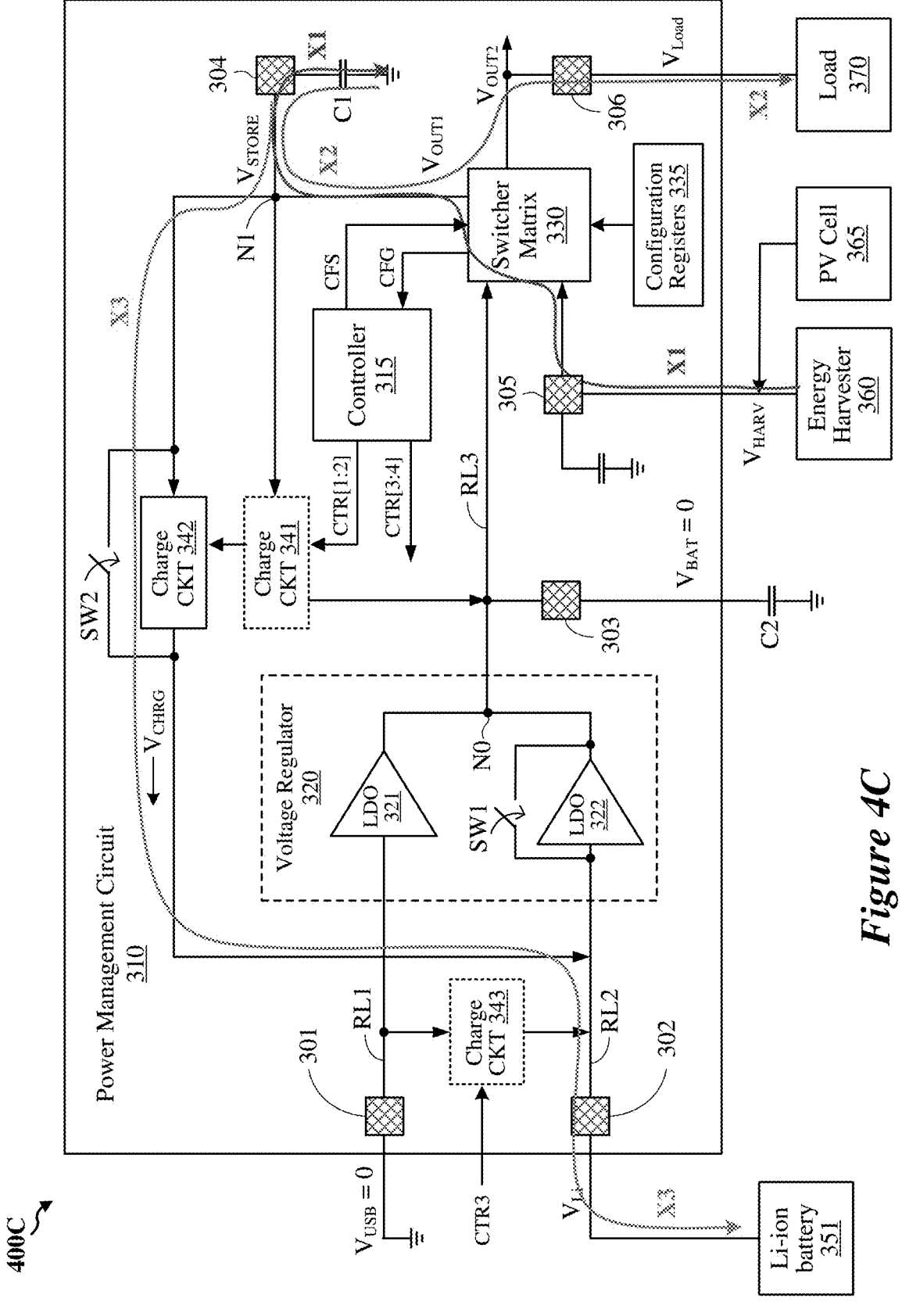
FIG. 4C shows a block diagram of the power management circuit of FIG. 3 in a third configuration, according to some implementations.

In some other instances, neither the USB power source 350 nor the low-voltage battery 352 may be available or connected to the host device and the lithium-ion battery 351, although connected to the host device, does not store enough charge or voltage to power the load 370 at system startup. In some aspects, the controller 315 may select a third configuration that uses the harvested energy to power the load 370 at system startup. For example, FIG. 4C depicts the third configuration 400C of the power management circuit 310, according to some implementations. As shown, neither the USB power source 350 nor the low-voltage battery are connected to the host device, and therefore the third configuration 400C connects respective first and third I/O ports 301 and 303 to ground and disables respective charge circuits 343 and 341. In some instances, third I/O port 303 may be coupled to ground via a capacitor C2 having a capacitance of approximately 10 μF. As discussed, when the lithium-ion battery 351 does not have enough charge or voltage to power the load 370 at system startup and neither the USB power source 350 nor the low-voltage battery 352 are available or connected to the host device, the controller 315 may configure, instruct, or otherwise cause the switcher matrix 330 to connect the energy harvester 360 to capacitor C1 at system startup so that the harvested voltage $V_{HARV}$ propagates through the switcher matrix 330, appears as $V_{OUT1}$ at node N1, and charges capacitor C1 via fifth I/O port 305 as indicated by arrow X1 in FIG. 4C.

When the accumulated charge or stored voltage $V_{STORE}$ on capacitor C1 reaches the threshold voltage, the switcher matrix 330 decouples capacitor C1 from the energy harvester 360 and then couples capacitor C1 to the load 370. The stored voltage $V_{STORE}$ on capacitor C1 propagates through the switcher matrix 330 as $V_{OUT2}$ and powers the load 370 via sixth I/O port 306, as indicated by arrow X2. In some instances, the controller 315 may use the second control signal CTR2 to disable the second charge circuit 342 while $V_{HARV}$ is used to charge capacitor C1 and $V_{STORE}$ is used to power the load 370. In this way, the controller 315 can isolate capacitor C1 from the lithium-ion battery 351 during system startup, which may increase the rate at which capacitor C1 is charged (e.g., by removing any loading associated with the lithium-ion battery 351). In some instances, the switcher matrix 330 may alternately enable the charging path from the energy harvester 360 to capacitor C1 and the charging path from capacitor C1 to the load 370 in a time-interleaved manner. In this way, the capacitor C1 can be incrementally charged by the energy harvester 360 while the capacitor C1 incrementally provides power to the load 370.

Once the load 370 is powered-up, configuration data indicating the battery type, operating voltage, and charging procedure of the lithium-ion battery 351 is read out as a configuration bitstream and stored in the configuration registers 335 associated with the switcher matrix 330. As discussed, the charging procedure may indicate the maximum current that can be used during the constant current mode and the minimum current that can be used during the constant voltage mode. In the example of FIG. 4C, the configuration signal CFS provided by the controller 315 configures, instructs, or otherwise causes the switcher matrix 330 to select the third configuration 400C for the power management circuit 310. The third configuration 400C enables the second charge circuit 342 and configures the switcher matrix 330 to connect capacitor C1 to the input of the second charge circuit 342 via node N1. The stored voltage $V_{STORE}$ on capacitor C1 appears at the input of the second charge circuit 342, which level-shifts the voltage $V_{STORE}$ to a higher charging voltage $V_{CHRG}$ suitable for charging the lithium-ion battery 351 to its operating voltage, as indicated by arrow X3. In some instances, $V_{STORE}$ is approximately 3.3V and the second charge circuit 342 generates a level-shifted charging voltage $V_{CHRG}$ of approximately 4.1V.

The level-shifted charging voltage $V_{CHRG}$ on rail RL2 may be used to provide a constant current to the lithium-ion battery 351 via second I/O port 302. The constant current is used to charge the lithium-ion battery 351 until the battery voltage VU reaches the maximum constant current level specified by the configuration data. In response thereto, the power management circuit 310 transitions from the constant current mode to the constant voltage mode of the charging procedure. During the constant voltage mode, the battery voltage $V_{Li}$ may be regulated at or near its operating voltage by gradually decreasing the charging current until the charging current drops below the minimum charging current specified for the lithium-ion battery 351, at which point the charging procedure is terminated. In some instances, the second charge circuit 342 may dynamically deliver power to the lithium-ion battery 351 based on the voltage $V_{STORE}$ held by capacitor C1. For example, if the voltage $V_{STORE}$ falls below a configured level while capacitor C1 is powering the load 370, the second charge circuit 342 may wait to charge the lithium-ion battery 351 using capacitor C1 until the voltage $V_{STORE}$ exceeds the configured level.

Figure 4D:
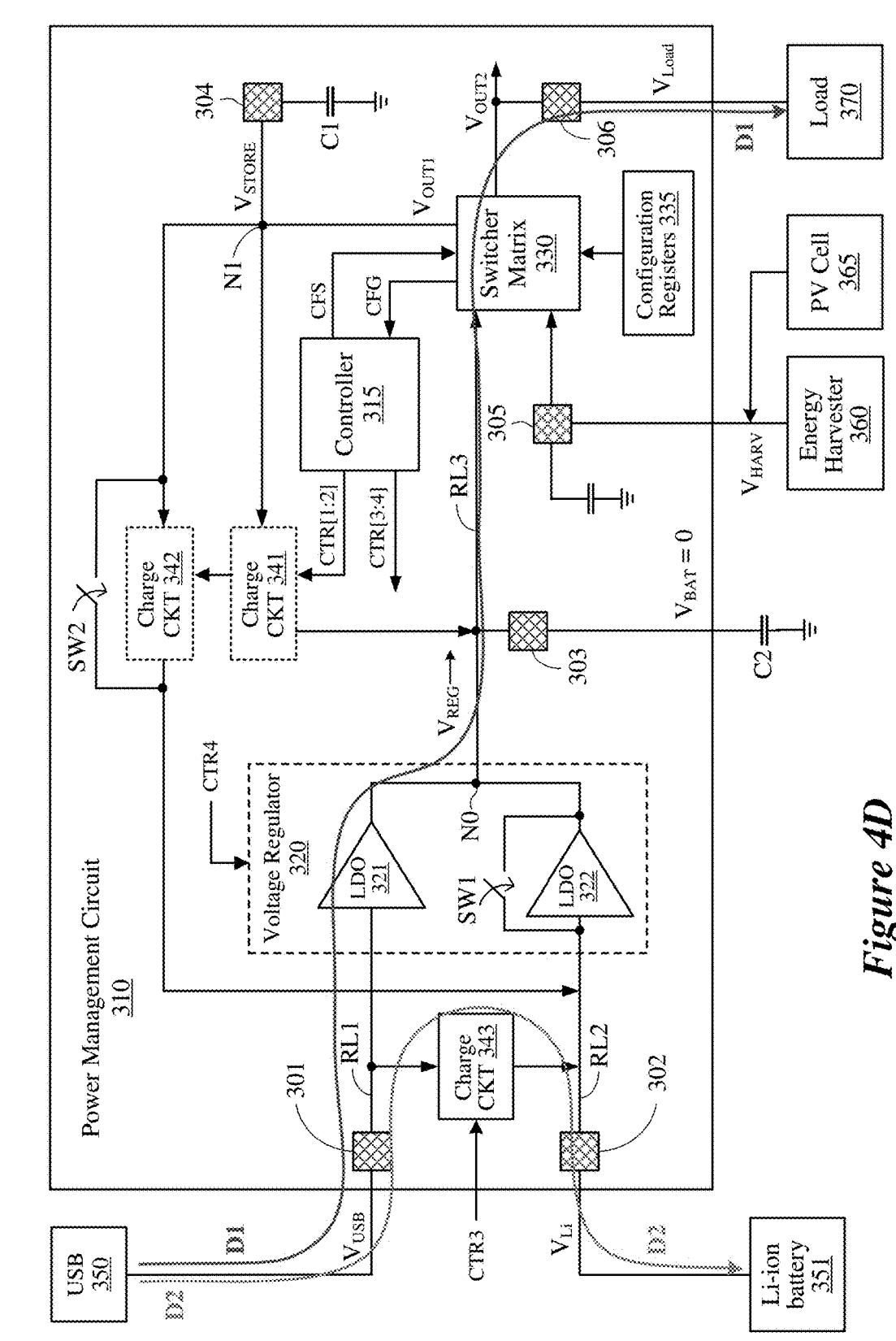
FIG. 4D shows a block diagram of the power management circuit of FIG. 3 in a fourth configuration, according to some implementations.

In some other instances, the USB power source 350 and the lithium-ion battery 351 may be connected to the host device and store enough charge or voltage to power the load 370 at system startup. The low-voltage battery 352 may not be connected to the host device. As discussed, in some aspects, the USB power source 350 may be assigned a higher priority than the lithium-ion battery 351, and thus the controller 315 may select a fourth configuration that uses the external USB power source 350 to power the load 370 at system startup. For example, FIG. 4D depicts the fourth configuration 400D of the power management circuit 310, according to some implementations. As shown, the USB power source 350 and the lithium-ion battery 351 are connected to the host device, and the low-voltage battery 352 is not connected to the host device. As such, the fourth configuration 400D connects respective first and third I/O ports 301 and 303 to ground and disables respective charge circuits 342 and 341. The controller 315 may configure, instruct, or otherwise cause the switcher matrix 330 to connect the USB power source 350 to the load 370 at system startup. The USB voltage $V_{USB}$ is provided as an input voltage to the voltage regulator 320 via first I/O port 301 and the first rail RL1. The voltage regulator 320 generates a regulated voltage $V_{REG}$ via the first LDO voltage regulator 321 based on the input voltage $V_{USB}$, and provides the regulated voltage $V_{REG}$ to the switcher matrix 330 via node N0 and the third rail RL3. The controller 315 may configure, instruct, or otherwise cause the switcher matrix 330 to connect the third rail RL3 to I/O port 306 at system startup so that the regulated voltage $V_{REG}$ propagates through the switcher matrix 330 and powers the load 370, as indicated by arrow D1.

Once the load 370 is powered-up, configuration data indicating the battery type, operating voltage, and charging procedure of the lithium-ion battery 351 is read out as a configuration bitstream and stored in the configuration registers 335 associated with the switcher matrix 330. As discussed, the charging procedure may indicate the maximum current that can be used during the constant current mode and the minimum current that can be used during the constant voltage mode. In the example of FIG. 4D, the configuration signal CFS provided by the controller 315 may configure, instruct, or otherwise cause the switcher matrix 330 to select the fourth configuration 400D for the power management circuit 310. The fourth configuration 400D enables the third charge circuit 343, which provides the USB voltage $V_{USB}$ on rail RL1 as a charging voltage on rail RL2 that is used to charge the lithium-ion battery 351 to its specified operating voltage, as indicated by arrow D2. In some instances, the charging voltage on rail RL2 may be used to provide a constant current to the lithium-ion battery 351 via second I/O port 302.

The constant current is used to charge the lithium-ion battery 351 until the battery voltage $V_{Li}$ reaches the maximum constant current level specified by the configuration data. In response thereto, the power management circuit 310 transitions from the constant current mode to the constant voltage mode of the charging procedure. During the constant voltage mode, the battery voltage $V_{Li}$ may be regulated at or near its operating voltage by gradually decreasing the charging current until the charging current drops below the minimum charging current specified for the lithium-ion battery 351, at which point the charging procedure is terminated.

As discussed, the third power management configuration depicted in FIG. 4C may be used to charge the lithium-ion battery 351 using the energy harvester 360 in conjunction with capacitor C1, while the fourth power management configuration depicted in FIG. 4D may be used to charge the lithium-ion battery 351 using the USB power source 350. In this way, the power management circuit 310 can be dynamically configured to charge the lithium-ion battery 351 using the USB power source 350 or the harvested energy stored in capacitor C1.

In some other implementations, the power management circuit 310 may dynamically route power between various combinations of the batteries 351-352, the energy harvester 360, the capacitor C1, the USB power source 350, and the load 370 based on priorities assigned to the different power management configurations contained in or indicated by the configuration data. In some instances, the power management circuit 310 may employ an algorithmic process to determine a sequential ordering of the different power management configurations based on the assigned priorities. For example, in some aspects, the power management circuit 310 may be initially configured to implement the power management configuration assigned to the highest priority, may be configured to implement the power management configuration assigned to the next-highest priority after a time period, and so on, and lastly may be configured to implement the power management configuration assigned to the lowest priority.

Figure 5A:
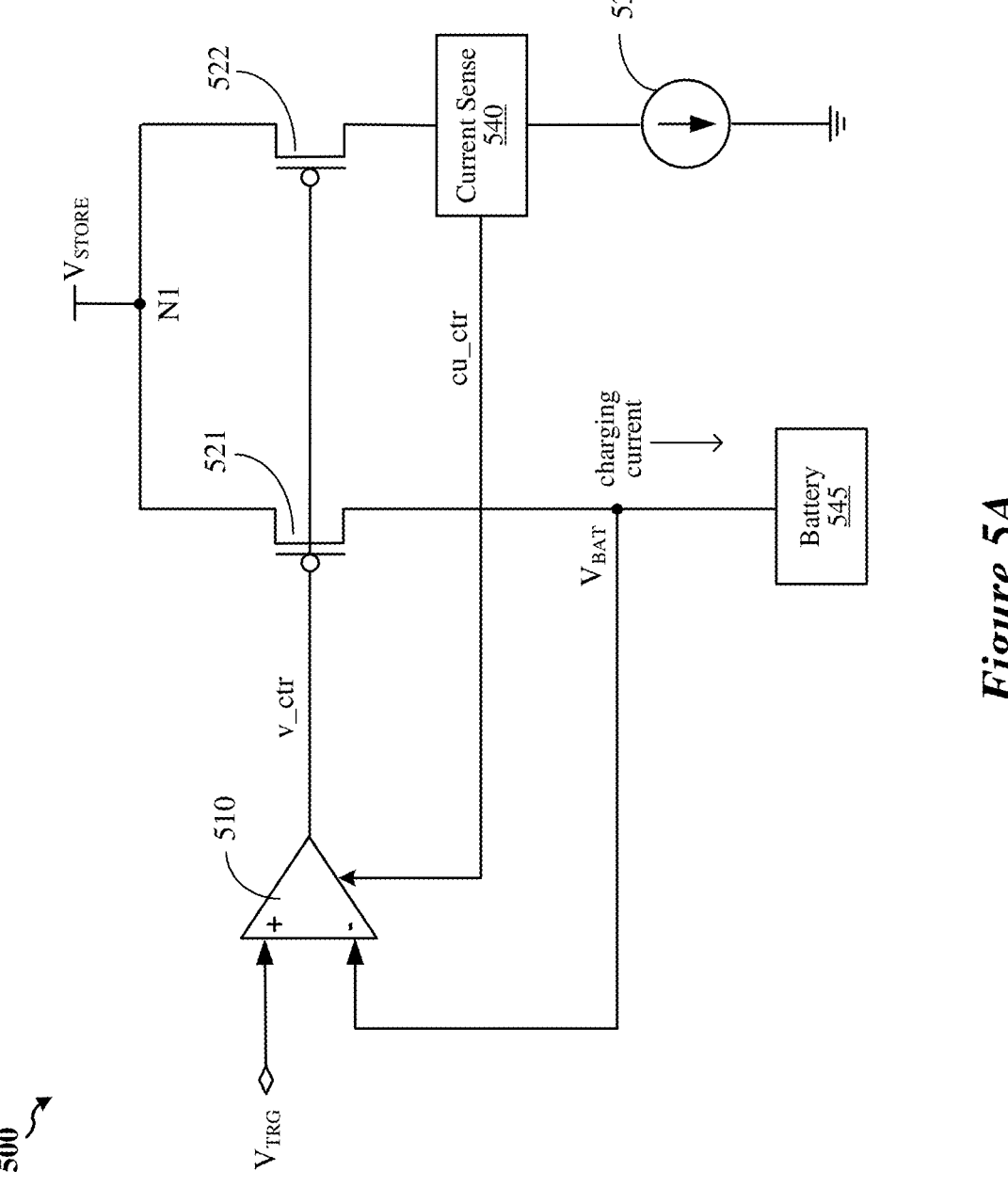
FIG. 5A shows an example voltage regulator that can be used as the first charge circuit of FIG. 3, according to some implementations.

FIG. 5A shows an example voltage regulator 500 that can be used as the first charge circuit 341 of FIG. 3, according to some implementations. In some instances, the voltage regulator 500 may be configured as an LDO voltage regulator that can emulate the constant current mode of a battery charging procedure. In the example of FIG. 5A, the voltage regulator 500 is shown to include an op-amp 510, two PMOS transistors 521-522, a programmable current source 530, and a current sense circuit 540. The op-amp 510 includes a positive input coupled to a reference target battery voltage ($V_{TRG}$), a negative input coupled to a battery 545, an output coupled to the respective gates of PMOS transistors 521 and 522, and a control terminal coupled to the current sense circuit 540. PMOS transistor 521 is coupled between node N1 of the power management circuit 310 of FIG. 3 and the battery 545, and PMOS transistor 522 is coupled between node N1 of the power management circuit 310 and the current sense circuit 540. The current sense circuit 540 includes a first terminal coupled to the drain of PMOS transistor 522, a second terminal coupled to the programmable current source 530, and a third terminal coupled to the control terminal of the op-amp 510. The programmable current source 530 is coupled between the current sense circuit 540 and ground, and may be programmed to source a specific current from node N1 to ground through PMOS transistor 522. The current sense circuit 540 generates a current control signal (cu_ctr) based on the amount of current sourced through PMOS transistor 522 by the programmable current source 530.

The sources of PMOS transistors 521-522 are coupled to each other via node N1, and the gates of PMOS transistors 521-522 are coupled to each other via the output terminal of the op-amp 510. The PMOS transistors 521-522 may form a current mirror in which the current sourced by the programmable current source 530 through PMOS transistor 522 is mirrored by PMOS transistor 521 and provided as a charging current to the battery 545. The voltage regulator 500 may initially operate in a constant current mode during which a charging current is provided to the battery 545 from the capacitor C1 through PMOS transistor 521. For example, the battery voltage $V_{BAT}$ is initially less than the target voltage $V_{TRG}$, which causes the op-amp 510 to drive a voltage control signal (v_ctr) low and thereby increase the current of PMOS transistors 521-522. The programmable current source 530 may be programmed to initially source the required charging current from node N1 to ground through PMOS transistor 522. PMOS transistor 521 mirrors the current through PMOS transistor 522, thereby sourcing the required charging current from node N1 to the terminal of battery 545 and charging the battery 545. The current sense circuit 540 regulates the control signal cu_ctr such that the voltage control signal v_ctr causes the current through PMOS transistor 521 to equal the current sourced by the programmable current source 530. The voltage drop across PMOS transistor 521 may provide a small step-down voltage that causes the charging voltage to be approximately 100 mV less than the voltage of $V_{STORE}$. The current through PMOS transistor 521 is a scaled factor of the current through PMOS transistor 522 and is therefore also a scaled factor of the current sourced by the programmable current source 530. The voltage regulator 500 continues charging the battery 545 with the required constant current through PMOS transistor 521 until the battery voltage $V_{BAT}$ becomes equal to the target voltage $V_{TRG}$.

The voltage regulator 500 may transition from the constant current mode to a constant voltage mode when $V_{BAT}=V_{TRG}$. During the constant voltage mode, the voltage regulator 500 regulates the battery voltage $V_{BAT}$ at approximately $V_{TRG}$ while allowing the battery 545 to continue drawing charging current from capacitor C1 via PMOS transistor 521 until the charging current drops below the minimum current level specified for the battery 545. Specifically, the current sense circuit 540 may be reconfigured to sense that the charging current is less than or equal to the minimum current level, and turns PMOS transistors 521-522 OFF to terminate the battery charging procedure.

In some implementations, the voltage regulator 500 is enabled when the stored voltage $V_{STORE}$ on capacitor C1 is greater than the battery voltage $V_{BAT}$ by at least a first hysteresis level ($V_{hyst\_start}$) and is disabled when the battery voltage $V_{BAT}$ is greater than the stored voltage $V_{STORE}$ on capacitor C1 by less than a second hysteresis level ($V_{hyst\_stop}$). That is, the voltage regulator 500 is enabled when $V_{STORE}>V_{BAT}+V_{hyst\_start}$ and is disabled when $V_{BAT}>V_{STORE}-V_{hyst\_stop}$ (e.g., when $V_{STORE}<V_{BAT}+V_{hyst\_stop}$). In some aspects, the first hysteresis level $V_{hyst\_start}$ is approximately 200 mV and the second hysteresis level $V_{hyst\_stop}$ is approximately 100 mV. The voltage levels of $V_{BAT}$ and $V_{STORE}$ are monitored using an analog-to-digital converter (ADC) implemented in the power management controller 315 of FIG. 3 (the ADC is not shown for simplicity). For these implementations, the maximum voltage to which the voltage regulator 500 can charge the battery 545 may be expressed as $V_{BAT,max}=V_{STORE}-V_{hyst\_start}=3.3V-0.2V=3.1V$. In some instances, the value of $V_{BAT,max}$ may be increased from approximately 3.1V to approximately 3.3V by enabling a bypass switch (not shown for simplicity) coupled between node N1 and the battery 545.

Figure 5B:
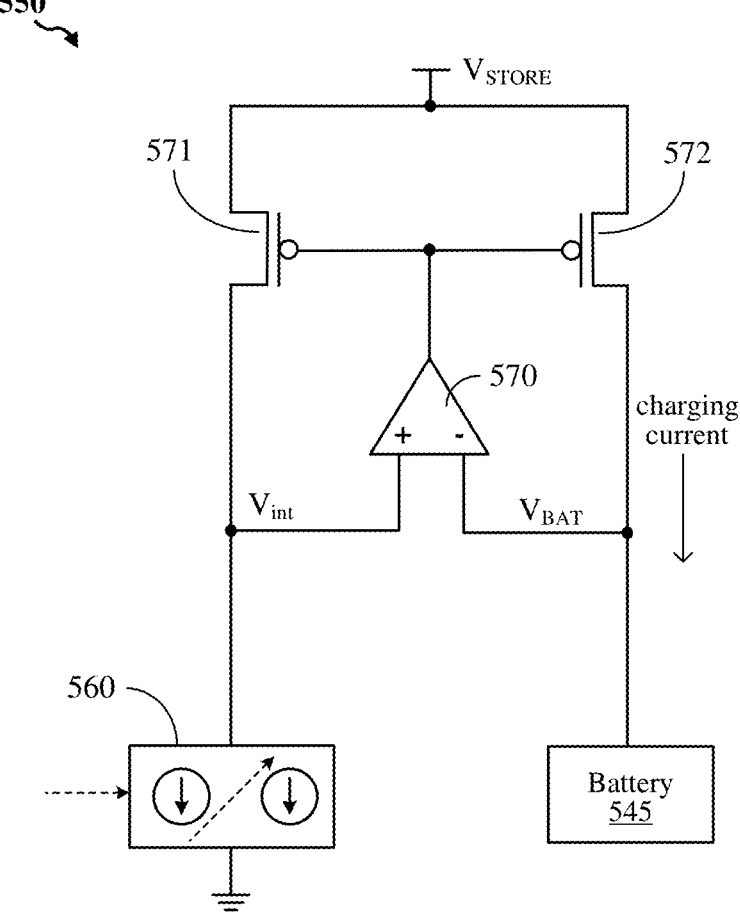
FIG. 5B shows an example programmable current mirror that can be used as the first charge circuit of FIG. 3, according to some implementations.

FIG. 5B shows an example programmable current mirror 550 that can be used as the first charge circuit 341 of FIG. 3, according to some implementations. In the example of FIG. 5B, the programmable current mirror 550 is shown to include a programmable current source 560, an op-amp 570, and two PMOS transistors 571-572. PMOS transistor 571 is coupled between node N1 of the power management circuit 310 and the current source 560, and PMOS transistor 572 is coupled between node N1 of the power management circuit 310 and the battery 545. As such, the sources of both PMOS transistors 571-572 are coupled to the voltage $V_{STORE}$ provided by capacitor C1. The op-amp 570 includes a positive input coupled to the drain of PMOS transistor 571, a negative input coupled to the drain of PMOS transistor 572, and an output to regulate the gates of PMOS transistors 571-572. The current mirror 550 is enabled when the stored voltage $V_{STORE}$ on capacitor C1 is greater than the battery voltage $V_{BAT}$ by at least a first hysteresis level ($V_{hyst\_start}$) and is disabled when the battery voltage $V_{BAT}$ is greater than the stored voltage $V_{STORE}$ on capacitor C1 by less than a second hysteresis level ($V_{hyst\_stop}$).

When the programmable current mirror 550 is enabled, PMOS transistor 572 sources a charging current from the capacitor C1 to the input terminal of the battery 545, thereby charging the battery 545. The voltage levels at $V_{BAT}$ and $V_{STORE}$ are monitored using the ADC implemented in the power management controller 315 of FIG. 3. The op-amp 570 regulates a voltage ($V_{int}$) to track the voltage level of $V_{BAT}$ and thereby implements an accurate current mirror independent of the drain to gate voltages of PMOS transistors 571-572. In various aspects, the programmable current mirror 550 may emulate the constant voltage mode by incrementally reducing the charging current provided to the battery 545 so that the battery voltage $V_{BAT}$ remains at or near the target battery voltage. Specifically, rather than maintaining a constant battery voltage during the constant voltage mode as described with respect to the voltage regulator 500 of FIG. 5, the programmable current mirror 550 emulates the constant voltage mode by incrementally decreasing the charging current provided by the current source 560, which in turn maintains the battery voltage $V_{BAT}$ at a constant (or near-constant) value. The programmable current mirror 550 is enabled and disabled based on monitoring the voltage level at $V_{BAT}$ and comparing $V_{BAT}$ with the target voltage $V_{TRG}$. This sensing and monitoring can be implemented using the ADC in the power management controller 315 of FIG. 3.

Although not shown for simplicity, in some aspects, the programmable current mirror 550 may include a plurality of output stages that can be selectively enabled or disabled to dynamically adjust the current limit applied to the charging current, thereby allowing the programmable current mirror 550 to be used with various batteries having different specified maximum charging currents. In some instances, the programmable current mirror 550 may be simpler to implement than the LDO voltage regulator 500 described with respect to FIG. 5A, and therefore may be well-suited for batteries having charging procedures that do not include a constant voltage mode.

In some implementations, the programmable current mirror 550 is enabled when the stored voltage $V_{STORE}$ on capacitor C1 is greater than the battery voltage $V_{BAT}$ by at least a first hysteresis level ($V_{hyst\_start}$) and is disabled when the battery voltage $V_{BAT}$ is greater than the stored voltage $V_{STORE}$ on capacitor C1 by less than a second hysteresis level ($V_{hyst\_stop}$). That is, the programmable current mirror 550 is enabled when $V_{STORE} > V_{BAT} + V_{hyst\_start}$ and is disabled when $V_{BAT} > V_{STORE} - V_{hyst\_stop}$ (e.g., when $V_{STORE} < V_{BAT} + V_{hyst\_stop}$). In some aspects, the first hysteresis level $V_{hyst\_start}$ is approximately 200 mV and the second hysteresis level $V_{hyst\_stop}$ is approximately 100 mV. For these implementations, the maximum voltage to which the programmable current mirror 550 can charge the battery 545 may be expressed as $V_{BAT,max} = V_{STORE} - V_{hyst\_start} = 3.3V - 0.2V = 3.1V$. In some instances, the value of $V_{BAT,max}$ may be increased from approximately 3.1V to approximately 3.3V by enabling a bypass switch coupled between node N1 and the battery 545.

Figure 6A:
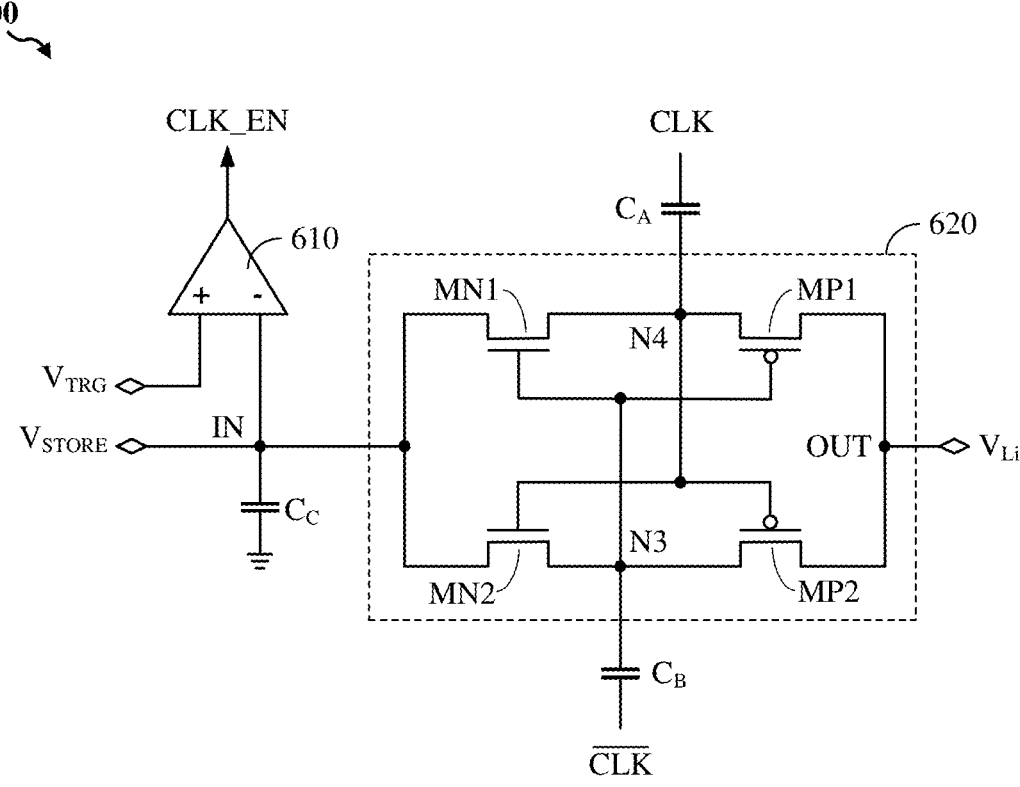
FIG. 6A shows an example voltage rectifier that can be used as the second charge circuit of FIG. 3, according to some implementations.

FIG. 6A shows an example voltage rectifier 600 that can be used as the second charge circuit 342 of FIG. 3, according to some implementations. The voltage rectifier 600 is shown to include an input terminal (IN) to receive the stored voltage $V_{STORE}$ provided by the capacitor C1, an output terminal (OUT) coupled to the input terminal of the lithium-ion battery 351, NMOS transistors MN1-MN2, PMOS transistors MP1-MP2, a comparator 610, and capacitors $C_A$-$C_C$. Transistors MN1 and MP1 are connected in series between the input terminal IN and the output terminal OUT, with the sources of MN1 and MP1 both coupled to a clock signal CLK via capacitor $C_A$ at node N3. Transistors MN2 and MP2 are connected in series between the input terminal IN and the output terminal OUT, with the sources of MN2 and MP2 both coupled to a complemented clock signal $\overline{CLK}$ via capacitor $C_B$ at node N4. The gates of transistors MN1 and MP1 are both coupled to the sources of transistors MN2 and MP2 at node N3, and the gates of transistors MN2 and MP2 are both coupled to the sources of transistors MN1 and MP1 at node N4.

The transistors MN1 and MP1 form a first CMOS inverter, and transistors MN2 and MP2 form a second CMOS inverter. The first and second CMOS inverters are cross-coupled with each other, thereby forming a CMOS latch 620. In some instances, the clock signal CLK may be powered by the stored voltage $V_{STORE}$ provided by capacitor C1, and therefore the clock signal CLK may transition between approximately 0 volts and the supply voltage. As such, the voltage rectifier 600 can drive its output terminal OUT, and thus the lithium-ion battery 351, with a charging voltage that is approximately twice the voltage of $V_{STORE}$. In this way, when the clock signal CLK is idle, there is no leakage current between the capacitor C1 and the lithium-ion battery 351. In some aspects, state transitions of the clock signal CLK can charge and discharge capacitor $C_A$, and state transitions of the complemented clock signal $\overline{CLK}$ can charge and discharge capacitor $C_B$, as described below.

The comparator 610 includes a positive input to receive the target battery voltage $V_{TRG}$, a negative input to receive $V_{STORE}$ at node N1 (see also FIG. 3), and an output to generate a clock enable signal CLK_EN associated with the clock signal CLK signal (e.g., CLK is enabled or "running" when CLK_EN is asserted, and CLK is disabled or "stopped" when CLK_EN is de-asserted). In operation, the comparator 610 compares $V_{STORE}$ with a target battery voltage $V_{TRG}$ to generate the clock enable signal CLK_EN. When $V_{STORE}$ is greater than $V_{TRG}$, the comparator 610 asserts the clock enable signal CLK_EN to logic high, which turns on the clock signal CLK and the complemented clock signal $\overline{CLK}$. When $V_{STORE}$ is less than $V_{TRG}$, the comparator 610 de-asserts CLK_EN to logic low, which turns OFF the clock signal CLK and the complemented clock signal $\overline{CLK}$ (e.g., such that CLK is logic low and CLK is logic high). By selectively enabling and disabling the clock signal CLK based on the level or value of $V_{STORE}$, and therefore selectively adjusting the duty cycle of CLK_EN, the level or value of $V_{STORE}$ is regulated at $V_{TRG}$ by the loop. In some aspects, the value of $V_{STORE}$ may be adjusted to be approximately equal to $V_{Li} - V_{CLK}$, where $V_{Li}$ is the instantaneous voltage level, and then tracking the level of $V_{Li}$ so that the difference $V_{Li} - V_{CLK}$ can be maintained over time. In this way, aspects of the present disclosure can control the charging current during the constant current mode of the battery charging procedure. Also, when the clock signal CLK is OFF, the battery voltage $V_{Li}$ is isolated from the charge voltage $V_{STORE}$, thereby preventing leakage between the input terminal IN and the output terminal OUT.

The voltage rectifier 600 can also emulate the constant voltage mode of the battery charging procedure by controlling the frequency of the clock signal CLK and the complemented clock signal $\overline{CLK}$ in conjunction with controlling the duty cycle of CLK and $\overline{CLK}$, which can maintain the charging voltage at a constant value during the constant voltage mode. Thus, although the clock signal CLK and the complemented clock signal $\overline{CLK}$ may be active during both the constant current mode and the constant voltage mode, the frequency of the clock signal CLK and the complemented clock signal $\overline{CLK}$ can be decreased to emulate the constant voltage mode.

In other implementations, the input IN of the voltage rectifier 600 may be coupled to $V_{HARV}$ rather than $V_{STORE}$, for example, when there are no requirements for the level of $V_{HARV}$ to provide optimal power transfer from the energy harvester 360 (or the photovoltaic cell 670). In such implementations, the negative input of the comparator 610 may be coupled to $V_{HARV}$, and $V_{HARV}$ may be regulated in a manner similar to the regulation of $V_{STORE}$, as described above.

As discussed, in some instances, the operating voltage of the lithium-ion battery 351 may be as high as 4.5V, and the output terminals of the switcher matrix 330 may have a maximum voltage of approximately 3.3V. In such instances, the voltage rectifier 600 may operate as a step-up circuit or charge pump to level-shift the voltage output from the switcher matrix 330 from approximately 3.3V to approximately 4.5V. In some instances, the CLK_EN duty cycle is implicitly controlled by the loop to maintain the value of $V_{STORE}$ at or near the target battery voltage $V_{TRG}$, which in turn may be adjusted based on the instantaneous value of $V_{Li}$ such that $V_{TRG}$-$V_{Li}$-$V_{CLK}$-$V_x$, where $V_x$ is a programmable offset voltage that can be used to control the charging current during the constant current mode.

In other implementations, the comparator 610 may be replaced by an ADC that converts the voltage levels of $V_{STORE}$ and $V_{Li}$ into respective digital signals, and the power management circuit 310 may compare the respective digital signals in the digital domain to adjust the duty cycle of the clock signal CLK.

Figure 6B:
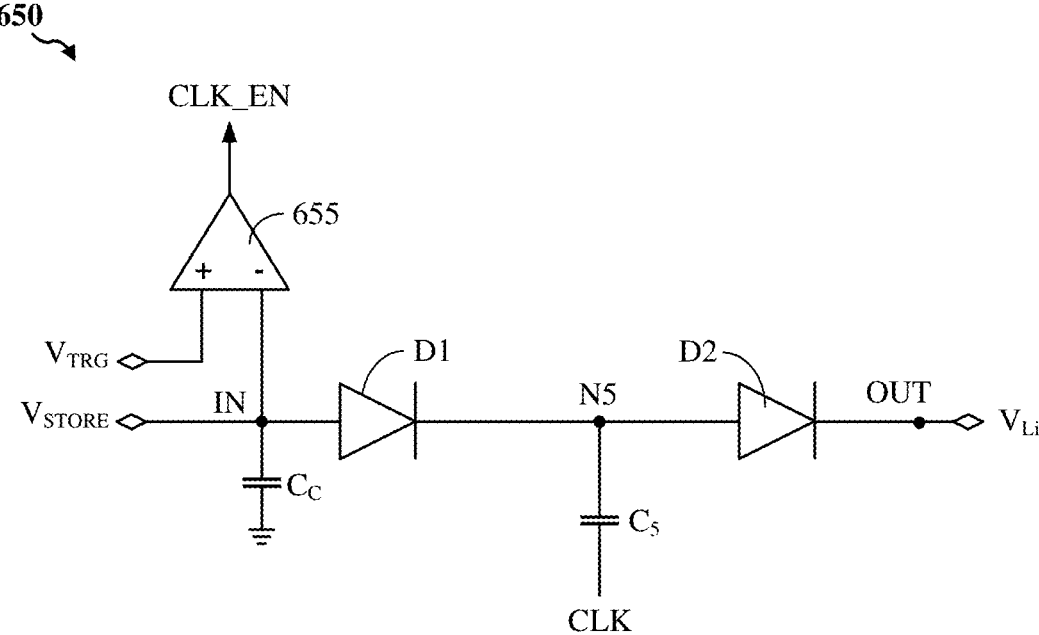
FIG. 6B shows an example diode circuit that can be used as the second charge circuit of FIG. 3.

FIG. 6B shows an example diode circuit 650 that can be used as the second charge circuit 342 of FIG. 3. The diode circuit 650 is shown to include a pair of diodes D1-D2, a capacitor C5, and a comparator 655. The diodes D1-D2 are connected in series between the capacitor C1 of FIG. 3 via an input terminal IN and the lithium-ion battery 351 via an output terminal OUT. The input terminal IN of the diode circuit 650 receives $V_{STORE}$ and the output terminal OUT of the diode circuit 650 charges the battery voltage $V_{Li}$ of the lithium-ion battery 351. The capacitor $C_5$ is coupled between node N5 and the clock signal CLK. In some instances, the clock signal CLK may be powered by the stored voltage $V_{STORE}$ provided by capacitor C1, and therefore the clock signal CLK may transition between approximately 0 volts and the supply voltage. As such, the diode circuit 650 can drive its output terminal OUT, and thus the lithium-ion battery 351, with a charging voltage that is greater than the voltage of $V_{STORE}$. In this way, when the clock signal CLK is idle, there is no leakage current between the capacitor C1 and the lithium-ion battery 351. In some aspects, state transitions of the clock signal CLK can charge and discharge capacitor $C_A$, and state transitions of the complemented clock signal $\overline{CLK}$ can charge and discharge capacitor $C_B$, as described below.

The comparator 655 includes a positive input to receive the target battery voltage $V_{TRG}$, a negative input to receive $V_{STORE}$ at node N1 (see also FIG. 3), and an output to generate a clock enable signal CLK_EN for the clock signal CLK. In operation, the comparator 655 compares $V_{STORE}$ with $V_{TRG}$ to generate CLK_EN. When $V_{STORE}$ is greater than $V_{TRG}$, the comparator 655 asserts CLK_EN to logic high, which turns on the clock signal CLK and the complemented clock signal $\overline{CLK}$. When $V_{STORE}$ is lower than $V_{TRG}$, the comparator 655 de-asserts CLK_EN to logic low, which turns OFF the clock signal CLK and the complemented clock signal $\overline{CLK}$ (e.g., such that CLK is logic low and $\overline{CLK}$ is logic high). By selectively enabling and disabling the clock signal CLK based on the level or value of $V_{STORE}$, and therefore selectively adjusting the duty cycle of CLK_EN, the level or value of $V_{STORE}$ is regulated at $V_{TRG}$ by diode circuit 650. In this way, when the clock signal CLK is on, the battery voltage $V_{Li}$=$V_{STORE}$+$V_{CLK}$. When the clock signal CLK is off, the battery voltage $V_{Li}$=$V_{STORE}$-2*$V_{diode}$, where 2*$V_{diode}$ is the voltage drop across the diodes D1 and D2. In some instances, the diode circuit 650 may enable the clock signal CLK when the battery voltage $V_{Li}$ is greater than approximately 3.3V. The level of the charging current may be controlled by regulating $V_{STORE}$ to be approximately equal to $V_{Li}$-$V_{CLK}$-$V_x$, where $V_x$ is an offset voltage.

In other implementations, the input IN of the diode circuit 650 may be coupled to $V_{HARV}$ rather than $V_{STORE}$, for example, when there are no requirements for the level of $V_{HARV}$ to provide optimal power transfer from the energy harvester 360 (or the photovoltaic cell 670). In such implementations, the negative input of the comparator 655 may be coupled to $V_{HARV}$, and $V_{HARV}$ may be regulated in a manner similar to the regulation of $V_{STORE}$, as described above.

The diodes D1-D2 and the capacitor C5 may be implemented either on chip or off chip. In some implementations, the diodes D1-D2 and the capacitor C5 are implemented off-chip, and the clock signal CLK is the only signal routed off-chip. Implementing the diodes D1-D2 and the capacitor C5 may provide better performance, such as lower turn-ON voltages and lower reverse leakages, than implementing the diodes D1-D2 and the capacitor C5 on-chip. In some instances, the clock signal CLK may be routed to the off-chip diodes D1-D2 and capacitor C5 via a general-purpose input-output (GPIO) pin (not shown for simplicity).

FIG. 6C shows an example DC-to-DC boost converter 660 that can be used as the second charge circuit 342 of FIG. 3, according to some implementations. The boost converter 660 includes an input IN to receive $V_{STORE}$ at node N1 (see also FIG. 3), an output OUT to charge the battery voltage $V_{Li}$ of the lithium-ion battery 351, and an inductor L1 and a Schottky diode D3 coupled in series between the input IN and the output OUT. In some aspects, the Schottky diode D3 may include hysteresis. The boost converter 660 also includes an input capacitor $C_{IN}$ coupled between the input IN and ground, an NMOS transistor MN6 coupled between node N6 and ground, and an output capacitor $CO_{UT}$ coupled between the output OUT and ground. The gate of NMOS transistor MN6 is driven by a clock signal CLK. In some instances, the clock signal CLK may be powered by the stored voltage $V_{STORE}$ provided by capacitor C1, and therefore the clock signal CLK may transition between approximately 0 volts and the supply voltage. As such, the boost converter 660 can drive its output terminal OUT, and thus the lithium-ion battery 351, with a charging voltage that is greater than the voltage of $V_{STORE}$. In addition, when the clock signal CLK is idle, there is no leakage current between the input IN and output OUT of the boost converter 660, and therefore no leakage current between capacitor C1 and the lithium-ion battery 351 of FIG. 3.

The comparator 680 includes a positive input to receive $V_{TRG}$, a negative input to receive $V_{STORE}$, and an output to generate a clock enable signal CLK_EN for the clock signal CLK. In operation, the comparator 680 compares $V_{STORE}$ with $V_{TRG}$ to generate the clock enable signal CLK_EN, which is provided to the gate of NMOS transistor MN6 and can be used to selectively enable and disable the clock signal CLK. For example, when $V_{STORE}$ is greater than $V_{TRG}$, the comparator 680 asserts CLK_EN to logic high, which turns on the clock signal CLK. When CLK is in the logic high state, the NMOS transistor MN6 turns on and couples node N6 to ground. The inductor L1 is energized by the voltage $V_{STORE}$, and a current I through the inductor Li begins to increase until CLK transitions to the logic low state. When CLK is in the logic low state, the inductor current I is dumped to the output OUT via the Schottky diode D3, thereby charging the battery voltage $V_{Li}$. In this way, the level or value of $V_{STORE}$ can be regulated by the inductive boost converter at $V_{TRG}$. In some aspects, the level or value of $V_{STORE}$ can drop below $V_{TRG}$ when the harvested voltage $V_{HARV}$ is not sufficient to charge $V_{STORE}$, which in turn may maintain the clock signal CLK in a disabled state.

Conversely, when $V_{STORE}$ is less than $V_{TRG}$, the comparator 680 de-asserts CLK_EN to logic low, which turns OFF the clock signal CLK. By selectively enabling and disabling the clock signal CLK based on the level or value of $V_{STORE}$, and thereby selectively adjusting the duty cycle of CLK_EN, the level or value of $V_{STORE}$ is regulated at $V_{TRG}$ by the boost converter 660. In this way, when the clock signal CLK is on, the battery voltage $V_{Li}=V_{STORE}*(\text{Tup}+\text{Tdn})/\text{Tdn}$.

The inductor Li may be implemented as an external component, and the NMOS transistor MN6 and diode D3 may be implemented either on chip or off chip. In some implementations, NMOS transistor MN6 and Schottky diode D3 are implemented off-chip, and the clock signal CLK is the only signal routed off-chip. Implementing NMOS transistor MN6 and Schottky diode D3 off-chip may provide better performance, such as lower turn-ON voltages and lower reverse leakages, than implementing NMOS transistor MN6 and Schottky diode D3 on-chip. In some instances, the clock signal CLK may be routed to off-chip NMOS transistor MN6 via a general-purpose input-output (GPIO) pin (not shown for simplicity).

In other implementations, the input IN of the boost converter 660 may be coupled to $V_{HARV}$ rather than $V_{STORE}$, for example, when there are no requirements for the level of $V_{HARV}$ to provide optimal power transfer from the energy harvester 360 (or the photovoltaic cell 670). In such implementations, the negative input of the comparator 680 may be coupled to $V_{HARV}$, and $V_{HARV}$ may be regulated in a manner similar to the regulation of $V_{STORE}$, as described above.

In some other implementations, the second charging circuit 342 of FIG. 3 may be selectively bypassed using a bypass switch SW2 connected between $V_{STORE}$ and $V_{Li}$, as shown in FIG. 3. For example, when $V_{STORE}$ is less than approximately 3.3V, the power management circuit 310 may enable the bypass switch SW2 and connect $V_{STORE}$ to $V_{Li}$. When $V_{STORE}$ is greater than approximately 3.3V, the power management circuit 310 may disable the bypass switch SW2 and enable the second charging circuit 342 (e.g., one of the voltage rectifier 600 of FIG. 6A, the diode circuit 650 of FIG. 6B, or the boost converter 660 of FIG. 6C). Thereafter, the sensed voltage levels may be used to dynamically assert the clock signal CLK as described with reference to FIGS. 6A-6C.

Figure 7A:
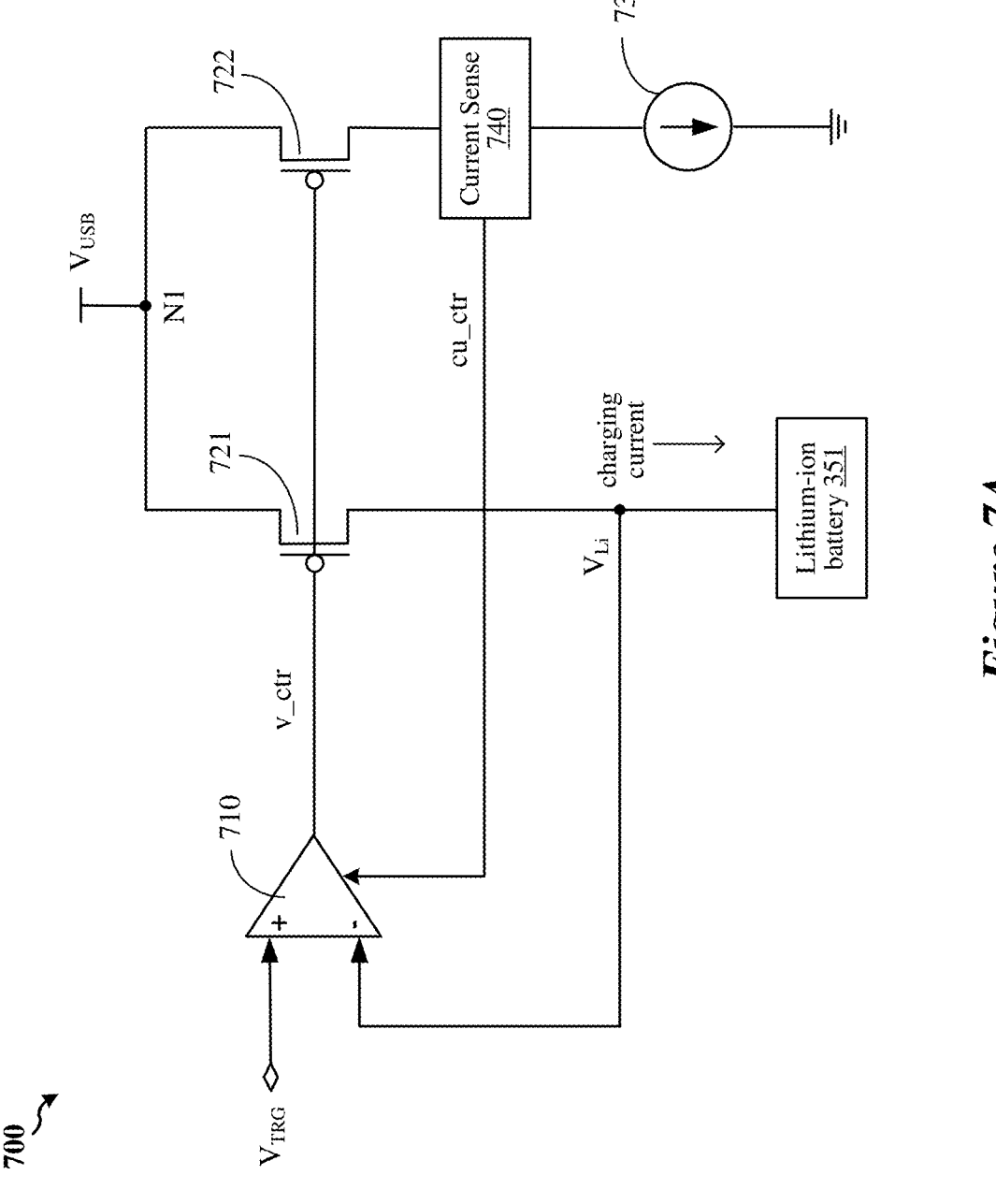
FIG. 7A shows an example voltage regulator that can be used as the third charge circuit of FIG. 3, according to some implementations.

FIG. 7A shows an example voltage regulator 700 that can be used as the third charge circuit 343 of FIG. 3, according to some implementations. In some instances, the voltage regulator 700 may be configured as an LDO voltage regulator with current limiting that can emulate the constant current mode of a lithium-ion battery charging procedure. In the example of FIG. 7A, the voltage regulator 700 is shown to include an op-amp 710, two PMOS transistors 721-722, a programmable current source 730, and a current sense circuit 740. The op-amp 710 includes a positive input coupled to a reference target battery voltage ($V_{TRG}$), a negative input coupled to the lithium-ion battery 351, an output coupled to the respective gates of PMOS transistors 721 and 722, and a control terminal coupled to the current sense circuit 740. PMOS transistor 721 is coupled between node N1 of the power management circuit 310 of FIG. 3 and the lithium-ion battery 351, and PMOS transistor 722 is coupled between node N1 of the power management circuit 310 and the current sense circuit 740.

The programmable current source 730 is coupled between the current sense circuit 740 and ground, and may be programmed to source a specific current and thus control the charging current for the lithium-ion battery 351. The current sense circuit 740 includes a first terminal coupled to the drain of PMOS transistor 722, a second terminal coupled to the programmable current source 730, and a third terminal coupled to the control terminal of the op-amp 710. The current sense circuit 740 generates a current control signal (cu_ctr) based on the amount of current sourced through PMOS transistor 722 by the programmable current source 730. The current control signal (cu_ctr) can be used to regulate the voltage control signal (v_ctr) provided by the op-amp 710, thereby forcing the current through PMOS transistor 722 to be equal to the current provided by the current source 730. In some instances, the current through PMOS transistor 721 is a scaled version of the current through PMOS transistor 722, for example, based on the mirroring ratio of PMOS transistors 721 and 722.

The sources of PMOS transistors 721-722 are coupled to each other via node N1, and the gates of PMOS transistors 721-722 are coupled to each other via the output terminal of the op-amp 710. The PMOS transistors 721-722 may form a current mirror in which the current sourced by the programmable current source 730 through PMOS transistor 722 is mirrored by PMOS transistor 721 and provided as a charging current to the lithium-ion battery 351. As long as the voltage level of $V_{Li}$ remains lower than the voltage level of $V_{TRG}$, the voltage control signal v_ctr is regulated by the current sense circuit 740 so that the current through PMOS transistors 721 and 722 remains constant. This mode of operation is the constant current mode.

The voltage regulator 700 may initially operate in a constant current mode during which the required charging current is provided to the lithium-ion battery 351 through PMOS transistor 721. The programmable current source 730 may be programmed to initially source the required charging current from node N1 to ground through PMOS transistor 722. PMOS transistor 721 mirrors the current through PMOS transistor 722, thereby sourcing the required charging current from node N1 to the terminal of the lithium-ion battery 351 and charging the lithium-ion battery 351. The voltage drop across PMOS transistor 721 may provide a small step-down voltage that causes the charging voltage to be approximately 100 mV less than the voltage of $V_{USB}$. The voltage regulator 700 continues charging the lithium-ion battery 351 with the maximum constant current through PMOS transistor 721 until the battery voltage $V_{Li}$ becomes equal to the target voltage $V_{TRG}$, and then the voltage regulator 700 transitions from the constant current mode to a constant voltage mode.

During the constant voltage mode, the voltage regulator 700 maintains the battery voltage $V_{Li}$ at approximately $V_{TRG}$ while allowing the lithium-ion battery 351 to continue drawing charging current from the USB power source 350 via PMOS transistor 721 until the charging current drops below the minimum current level specified for the lithium-ion battery 351. Specifically, the current sense circuit 740 senses that the charging current is less than or equal to the minimum current level, and turns off PMOS transistors 721-722 to terminate the battery charging procedure. In some aspects, the charging current can be limited to the maximum specified charging current using a current limiter within or associated with the switcher matrix 330.

Figure 7B:
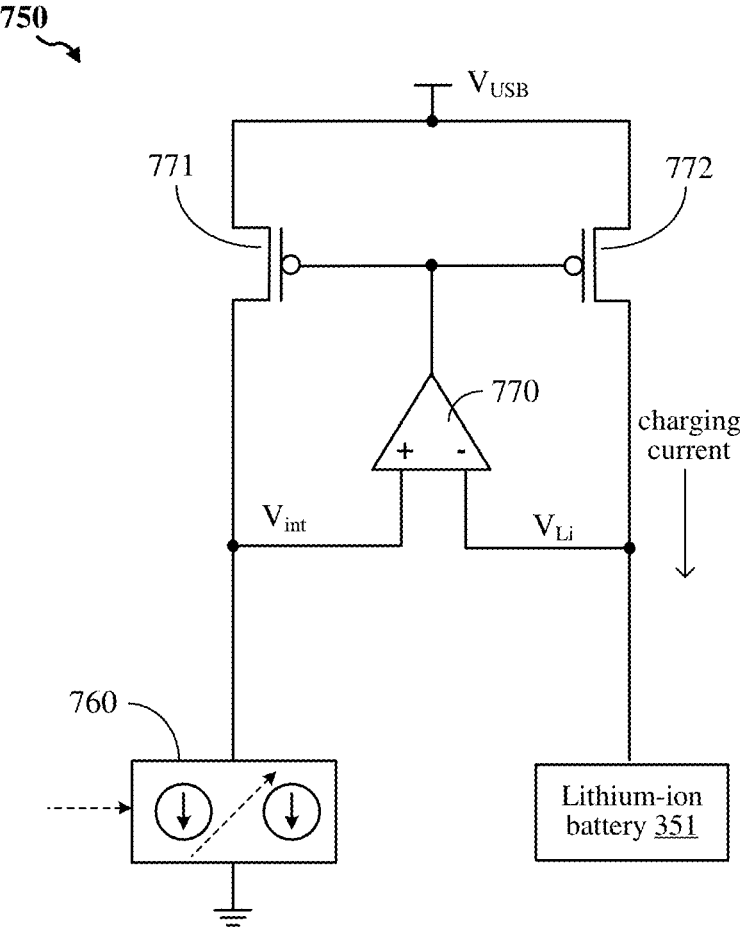
FIG. 7B shows an example programmable current mirror that can be used as the third charge circuit of FIG. 3, according to some implementations.

FIG. 7B shows an example programmable current mirror 750 that can be used as the third charge circuit 343 of FIG. 3, according to some implementations. In the example of FIG. 7B, the programmable current mirror 750 is shown to include a current limiter 760, an op-amp 770, and two PMOS transistors 771-772. PMOS transistor 771 is coupled between the USB power source 350 (not shown in FIG. 7B for simplicity) and the current limiter 760, and PMOS transistor 772 is coupled between the USB power source 350 and the lithium-ion battery 351. As such, the sources of both PMOS transistors 771-772 are coupled to the voltage $V_{USB}$ provided by the USB power source 350. The op-amp 770 includes a positive input coupled to the drain of PMOS transistor 771, a negative input coupled to the drain of PMOS transistor 772, and an output coupled to the gates of PMOS transistors 771-772. In some aspects, the op-amp 570 regulates the voltage $V_{int}$ to track the voltage level of $V_{Li}$ and thereby implements an accurate current mirror independent of the drain to gate voltages of PMOS transistors 771-772.

When the presence of the USB power source 350 is detected and the voltage level of $V_{USB}$ is greater than a minimum voltage while a lithium-ion battery charging operation is enabled, the current mirror 750 is enabled if the battery voltage $V_{Li}$ is less than the target battery voltage $V_{TRG}$. The PMOS transistor 772 sources a charging current from $V_{USB}$ to the input terminal of the lithium-ion battery 351, thereby charging the lithium-ion battery 351. The current limiter 760 is reconfigured to set the charging current to the required charging current specified for the lithium-ion battery 351. The PMOS transistor 772 continues charging the lithium-ion battery 351 with the required constant current until charging is disabled. The voltage level of $V_{Li}$ is monitored using the ADC implemented in the power management controller 315 of FIG. 3, and the charging procedure is disabled when voltage level of $V_{Li}$ reaches the target voltage level $V_{TRG}$.

In response thereto, the programmable current mirror 750 may transition from the constant current mode to a constant voltage mode. In various aspects, the programmable current mirror 750 may emulate the constant voltage mode by incrementally reducing the charging current provided to the lithium-ion battery 351 so that the battery voltage $V_{Li}$ remains at or near the target battery voltage $V_{TRG}$. The current mirror 750 is enabled and disabled based on monitoring the voltage level of $V_{Li}$ and comparing $V_{Li}$ with the target voltage. The sensing and monitoring operations can be performed by the ADC implemented in the power management controller 315 of FIG. 3.

FIG. 8 shows an illustrative flowchart depicting an example operation 800 for powering a wireless device, according to some implementations. The operation 800 may be performed by a power management circuit such as, for example, the power management circuit 310 of the wireless device 300 of FIG. 3. In some aspects, the operation 800 may be representative of one or more aspects of the present disclosure described with respect to the configurations 400A-400D of respective FIGS. 4A-4D. For example, at 802, the power management circuit determines the presence or absence of a USB power source connected to the wireless device. At 804, the power management circuit determines the presence or absence of a battery connected to the wireless device. At 806, the power management circuit obtains a level of energy harvested from a surrounding environment of the wireless device. At 808, the power management circuit powers a load of the wireless device using one of the USB power source, the battery, or the harvested energy based on the presence or absence of the USB power source, the presence or absence of the battery, and the harvested energy level.

The load may include a non-volatile memory and one or more of a processor, a transceiver, or an I/O interface that are powered-on at system startup. In various aspects, the non-volatile memory stores configuration data containing a plurality of charging configurations for the wireless device. In some instances, the harvested energy may be collected from radio-frequency (RF) signals transmitted in the surrounding environment. In other instances, the harvested energy may be collected from sunlight present in the surrounding environment.

FIG. 9A shows an illustrative flowchart depicting another example operation 900 for powering a wireless device, according to some implementations. The operation 900 may be performed by a power management circuit such as, for example, the power management circuit 310 of the wireless device 300 of FIG. 3. In some aspects, the operation 900 may be representative of one or more aspects of the present disclosure described with respect to the configurations 400A-400D of respective FIGS. 4A-4D. For example, at 902, the power management circuit selects the USB power source to power-on the load when the USB power source is determined to be present, irrespective of the presence or absence of the battery. At 904, the power management circuit powers the load with the USB power source by regulating a voltage provided to the load by the USB power source. In some instances, a low drop-out (LDO) voltage regulator may be used to regulate the voltage provided by the USB power source.

FIG. 9B shows an illustrative flowchart depicting another example operation 910 for powering a wireless device, according to some implementations. The operation 910 may be performed by a power management circuit such as, for example, the power management circuit 310 of the wireless device 300 of FIG. 3. In some aspects, the operation 910 may be performed after selecting the USB power source to power-on the load at 902 of FIG. 9A. For example, at 912, the power management circuit determines that a lithium-ion battery is connected to the wireless device. At 914, the power management circuit obtains configuration data from the non-volatile memory in response to powering on the load, the configuration data indicating a plurality of battery charging procedures. At 916, the power management circuit selects one of the plurality of battery charging procedures based on the lithium-ion battery being connected to the wireless device. At 918, the power management circuit charges the lithium-ion battery using the USB power source according to the selected battery charging procedure.

The selected battery charging procedure may include a constant current mode and a constant voltage mode. In some instances, the configuration data indicates a maximum charging current to be used for charging the lithium-ion battery during the constant current mode, a voltage at which the charging procedure transitions from the constant current mode to the constant voltage mode, and a minimum charging current to be used for charging the lithium-ion battery during the constant voltage mode.

FIG. 9C shows an illustrative flowchart depicting another example operation 920 for powering a wireless device, according to some implementations. The operation 920 may be performed by a power management circuit such as, for example, the power management circuit 310 of the wireless device 300 of FIG. 3. In some aspects, the operation 920 may be one example of charging the lithium-ion battery at 918 of FIG. 9B. For example, at 922, the power management circuit level-shifts an output voltage of the USB power source to a lower charging voltage. At 924, the power management circuit limits the charging current to the maximum charging current indicated by the selected battery charging procedure.

Figure 10A:
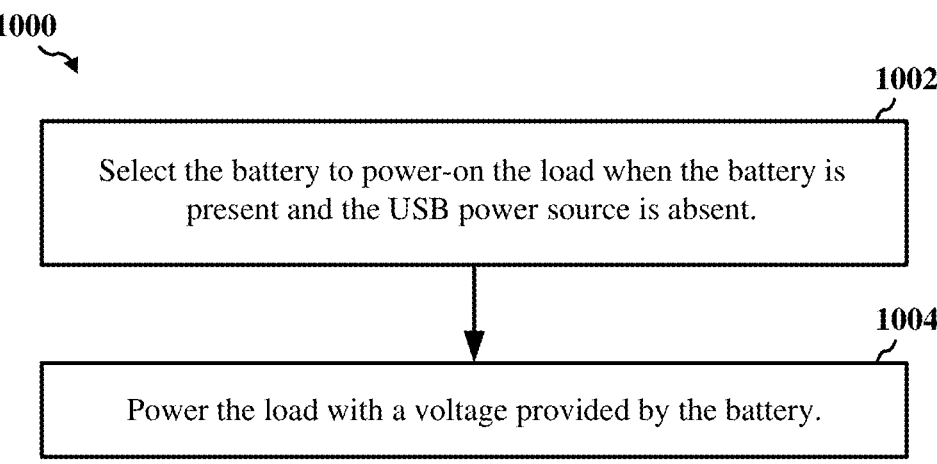

FIG. 10A shows an illustrative flowchart depicting another example operation 1000 for powering a wireless device, according to some implementations. The operation 1000 may be performed by a power management circuit such as, for example, the power management circuit 310 of the wireless device 300 of FIG. 3. In some aspects, the operation 1000 may be representative of one or more aspects of the present disclosure described with respect to the configurations 400A-400D of respective FIGS. 4A-4D. For example, at 1002, the power management circuit selects the battery to power-on the load when the battery is present and the USB power source is absent. At 1004, the power management circuit powers the load with a voltage provided by the battery.

Figure 10B:
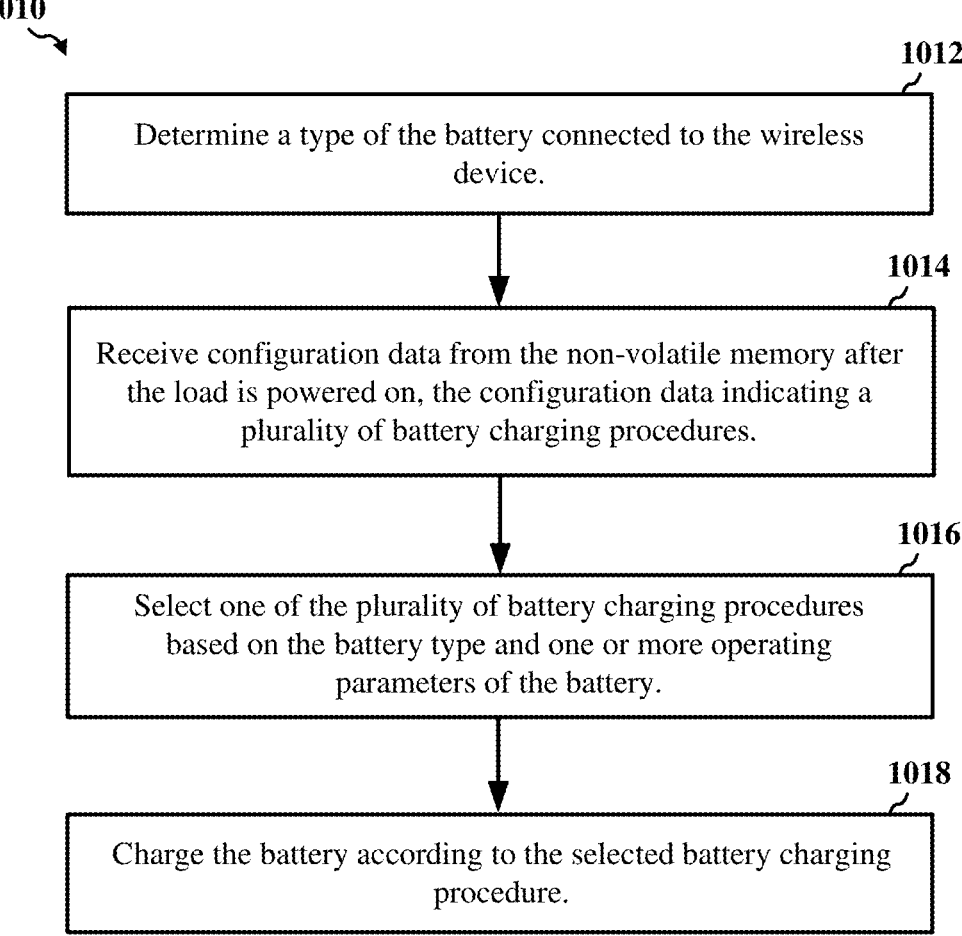

FIG. 10B shows an illustrative flowchart depicting another example operation 1010 for powering a wireless device, according to some implementations. The operation 1010 may be performed by a power management circuit such as, for example, the power management circuit 310 of the wireless device 300 of FIG. 3. In some aspects, the operation 1010 may be performed after powering the load at 1004 of FIG. 10A. For example, at 1012, the power management circuit determines a type of the battery connected to the wireless device. At 1014, the power management circuit receives configuration data from the non-volatile memory after the load is powered on, the configuration data indicating a plurality of battery charging procedures. At 1016, the power management circuit selects one of the plurality of battery charging procedures based on the battery type and one or more operating parameters of the battery. At 1018, the power management circuit charges the battery according to the selected battery charging procedure.

Figure 11A:
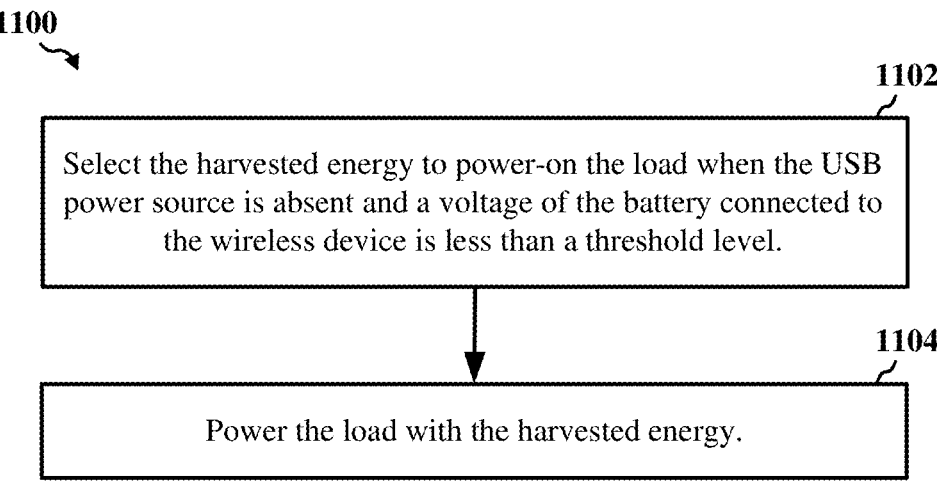

FIG. 11A shows an illustrative flowchart depicting another example operation 1100 for powering a wireless device, according to some implementations. The operation 1100 may be performed by a power management circuit such as, for example, the power management circuit 310 of the wireless device 300 of FIG. 3. For example, at 1102, the power management circuit selects the harvested energy to power-on the load when the USB power source is absent and the voltage of the battery connected to the wireless device is less than a threshold voltage. At 1104, the power management circuit powers the load with the harvested energy.

Figure 11B:
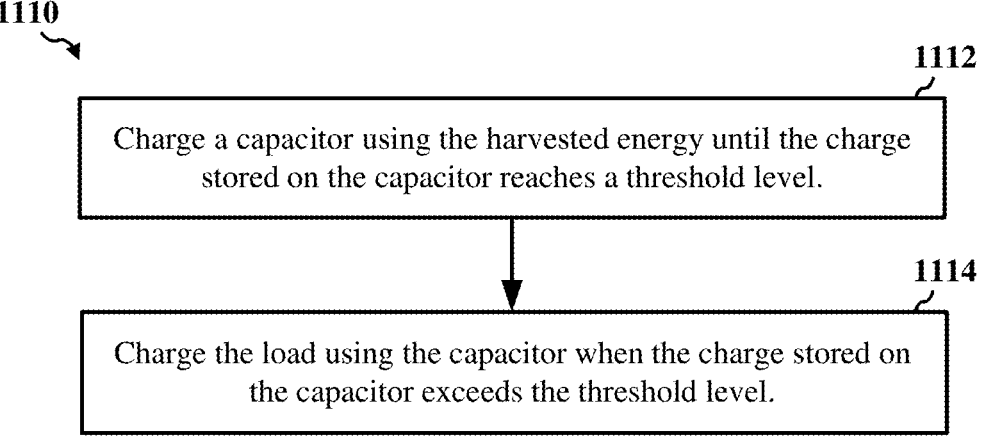

FIG. 11B shows an illustrative flowchart depicting another example operation 1110 for powering a wireless device, according to some implementations. The operation 1110 may be performed by a power management circuit such as, for example, the power management circuit 310 of the wireless device 300 of FIG. 3. In some aspects, the operation 1110 may be performed after powering on the load at 1104 of FIG. 11A. For example, at 1112, the power management circuit charges a capacitor using the harvested energy until the charge stored on the capacitor reaches a threshold level. At 1114, the power management circuit charges the load using the capacitor when the charge stored on the capacitor exceeds the threshold level.

Figure 11C:
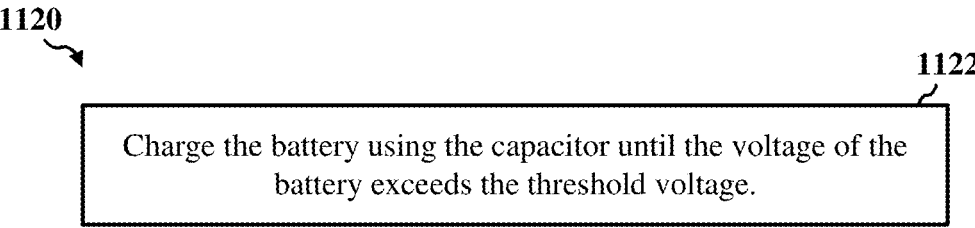

FIG. 11C shows an illustrative flowchart depicting another example operation 1120 for powering a wireless device, according to some implementations. The operation 1120 may be performed by a power management circuit such as, for example, the power management circuit 310 of the wireless device 300 of FIG. 3. In some aspects, the operation 1120 may be performed after charging the load at 1114 of FIG. 11B. For example, at 1122, the power management circuit charges the battery using the capacitor until the voltage of the battery exceeds the threshold voltage.

FIG. 12 shows an illustrative flowchart depicting another example operation 1200 for powering a wireless device, according to some implementations. The operation 1200 may be performed by a power management circuit such as, for example, the power management circuit 310 of the wireless device 300 of FIG. 3. In some aspects, the operation 1200 may be performed after powering the load at 808 of FIG. 8. For example, at 1202, the power management circuit determines a type of the battery connected to the wireless device. At 1204, the power management circuit obtains configuration data from a non-volatile memory associated with the load, the configuration data indicating a plurality of charging procedures for the battery. At 1206, the power management circuit selects one of the plurality of charging procedures based on the presence or absence of the USB power source, the level of the harvested energy, and the type of the battery. At 1208, the power management circuit charges the battery according to the selected battery charging procedure. In some instances, the configuration data is loaded from the non-volatile memory into a power management circuit in response to the load being powered on.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c. As used herein, "based on" is intended to be interpreted in the inclusive sense, unless otherwise explicitly indicated. For example, "based on" may be used interchangeably with "based at least in part on," unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described herein. Whether such functionality is implemented in hardware, firmware or software depends upon the application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described herein as acting combinations, and even initially claimed as such, one or more features from a claimed combination can in some instances be excised from the combination, and the claimed combination may be directed to a subcombination or variation of a subcombination.

Similarly, while operations are depicted in the drawings in a particular order, this should not be understood as requiring that such operations be performed in the order shown or in sequential order, or that all illustrated operations be performed, to achieve desirable results. Further, the drawings may schematically depict one or more example operations in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described herein should not be understood as requiring such separation in all implementations, and the described program components and systems can generally be integrated together in a single software product or packaged into multiple software products.

What is claimed is:

1. A method for powering a wireless device, comprising:
determining a presence or absence of an external USB power source connected to the wireless device;
determining a presence or absence of a battery within the wireless device;
obtaining a level of radio-frequency (RF) energy harvested within the wireless device from a surrounding environment of the wireless device;
selecting one of a plurality of power configurations stored in the wireless device to power-on a load of the wireless device based on a combination of the presence or absence of the external USB power source, the presence or absence of the battery within the wireless device, and the obtained level of the harvested RF energy;
generating a configuration signal indicative of the selected power configuration to power-on the load of the wireless device; and
powering on the load of the wireless device using only one of the external USB power source, the battery within the wireless device, or the harvested RF energy based on the configuration signal indicative of the selected power configuration.

2. The method of claim 1, wherein the load includes a non-volatile memory and one or more of a processor, a transceiver, or an I/O interface configured to be powered-on at system startup.

3. The method of claim 2, wherein the non-volatile memory stores configuration data containing a plurality of charging configurations for the wireless device.

4. The method of claim 1, wherein the harvested energy is collected from sunlight present in the surrounding environment.

5. The method of claim 1, wherein the selecting includes:
selecting the external USB power source to power-on the load when the external USB power source is determined to be present, irrespective of the presence or absence of the battery; and
powering the load with the external USB power source by regulating a voltage provided to the load by the external USB power source.

6. The method of claim 1, wherein the selecting includes:
selecting the battery to power-on the load when the battery is present and the external USB power source is absent; and
powering the load with a voltage provided by the battery.

7. The method of claim 6, further comprising:
determining a type of the battery connected to the wireless device;

receiving configuration data from a non-volatile memory associated with the load after the load is powered on, the configuration data indicating a plurality of battery charging procedures;
selecting one of the plurality of battery charging procedures based on the battery type and one or more operating parameters of the battery; and
charging the battery according to the selected battery charging procedure.

8. The method of claim 7, wherein the battery type is a low-voltage battery, and the selected battery charging procedure includes a constant current mode and not a constant voltage mode.

9. The method of claim 1, wherein the selecting includes:
selecting the harvested energy to power-on the load when the external USB power source is absent and a voltage of the battery connected to the wireless device is less than a threshold voltage; and
powering the load with the harvested energy.

10. The method of claim 9, wherein powering the load with the harvested energy includes:
charging a capacitor using the harvested energy until the charge stored on the capacitor reaches a threshold level; and
charging the load using the capacitor when the charge stored on the capacitor exceeds the threshold level.

11. The method of claim 10, further comprising:
charging the battery using the capacitor until the voltage of the battery exceeds the threshold voltage.

12. The method of claim 1, further comprising:
determining a type of the battery connected to the wireless device;
obtaining configuration data from a non-volatile memory associated with the load, the configuration data indicating a plurality of battery charging procedures;
selecting one of the plurality of battery charging procedures based on the type of the battery; and
charging the battery according to the selected battery charging procedure.

13. The method of claim 12, wherein the configuration data is loaded from the non-volatile memory into a power management circuit in response to the load being powered on.

14. The method of claim 1, wherein the battery comprises a coin battery.

15. The method of claim 1, wherein the battery comprises a lithium-ion battery.

16. A method for powering a wireless device, comprising:
determining a presence of an external USB power source connected to the wireless device and a presence of a battery within the wireless device;
powering-on a non-volatile memory of the wireless device using the external USB power source based on the presence of the external USB power source;
obtaining, from the non-volatile memory, configuration data indicating a plurality of battery charging procedures;
determining a type of the battery within the wireless device;
selecting one of the plurality of battery charging procedures based on the determined type of the battery within the wireless device; and
charging the battery within the wireless device using the external USB power source according to the selected battery charging procedure.

17. The method of claim 16, wherein the battery comprises a lithium-ion battery, and the selected battery charging procedure includes a constant current mode and a constant voltage mode.

18. The method of claim 17, wherein the selected battery charging procedure further indicates:

a maximum charging current to be used for charging the lithium-ion battery during the constant current mode;

a voltage at which the charging procedure transitions from the constant current mode to the constant voltage mode; and a minimum charging current to be used for charging the lithium-ion battery during the constant voltage mode.

19. The method of claim 18, wherein charging the battery further comprises:

level-shifting an output voltage of the external USB power source to a lower charging voltage; and limiting the charging current to the maximum charging current indicated by the selected battery charging procedure.

\* \* \* \* \*